US012111940B1

(12) United States Patent
Durand et al.

(10) Patent No.: US 12,111,940 B1
(45) Date of Patent: Oct. 8, 2024

(54) AUTHORIZING ACCESS TO OPERATING SYSTEM RESOURCES USING SECURITY POLICIES MANAGED BY SERVICE EXTERNAL TO THE OPERATING SYSTEM

(71) Applicant: Amazon Technologies, Inc., Seattle, WA (US)

(72) Inventors: Didier Germain Durand, Jougne (FR); Ilia Gilderman, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 17/457,640

(22) Filed: Dec. 3, 2021

(51) Int. Cl.
  *G06F 21/60* (2013.01)
  *G06F 9/50* (2006.01)

(52) U.S. Cl.
  CPC .......... *G06F 21/604* (2013.01); *G06F 9/5027* (2013.01)

(58) Field of Classification Search
  CPC .............................. G06F 21/604; G06F 9/5027
  See application file for complete search history.

(56) References Cited

U.S. PATENT DOCUMENTS

| | | | | |
|---|---|---|---|---|
| 6,055,637 | A * | 4/2000 | Hudson ............... | G06F 21/6218 726/20 |
| 8,689,281 | B2 * | 4/2014 | Balinsky ............. | G06F 21/6218 707/694 |
| 8,813,225 | B1 * | 8/2014 | Fuller ................. | H04L 67/51 726/25 |
| 10,084,784 | B1 * | 9/2018 | Brandwine .......... | H04L 63/102 |
| 10,757,128 | B2 * | 8/2020 | Cook .................. | H04L 41/0894 |
| 10,944,561 | B1 * | 3/2021 | Cahill ................. | H04L 9/3213 |
| 10,958,653 | B1 * | 3/2021 | Miller ................. | H04L 63/10 |
| 11,483,317 | B1 * | 10/2022 | Bolignano ........... | G06F 21/577 |
| 11,509,658 | B1 * | 11/2022 | Kulkarni .............. | H04W 12/60 |
| 2003/0172109 | A1 * | 9/2003 | Dalton ................ | G06F 21/62 709/203 |
| 2005/0102401 | A1 * | 5/2005 | Patrick ................ | G06F 21/6218 709/225 |
| 2007/0179955 | A1 * | 8/2007 | Croft .................. | H04L 63/10 707/999.009 |
| 2010/0280855 | A1 | 11/2010 | Gupta | |

(Continued)

OTHER PUBLICATIONS

Shebaro, "Context-based Access Control Systems for Mobile Devices", Apr. 2015, IEEE, vol. 12, pp. 1-13 (Year: 2015).

*Primary Examiner* — Jimmy H Tran
(74) *Attorney, Agent, or Firm* — Eversheds Sutherland (US) LLP

(57) ABSTRACT

Systems, devices, and methods are provided for authorizing access to operating system resources using security policies managed by a service external to the operating system. An operating system may be provisioned with a kernel-mode component that intercepts system calls from applications, determines a request context for the system call, and sends a request to an external policy management service. The policy management service may be used to perform a policy evaluation to determine whether to grant access to operating system resources. In some cases, policies are cached by the operating system. In various examples, the operating system and policy management service are both hosted on resources managed by a computing resource service provider on behalf of a customer to run mainframe workloads.

18 Claims, 17 Drawing Sheets

(56) References Cited

U.S. PATENT DOCUMENTS

| | | | |
|---|---|---|---|
| 2012/0023554 A1* | 1/2012 | Murgia | H04L 63/20 726/4 |
| 2012/0066487 A1* | 3/2012 | Brown | H04L 67/1027 709/224 |
| 2012/0117626 A1* | 5/2012 | Yates | H04L 63/101 726/4 |
| 2012/0233668 A1* | 9/2012 | Leafe | G06F 9/44526 726/4 |
| 2014/0032733 A1* | 1/2014 | Barton | G06F 21/6218 709/223 |
| 2014/0196130 A1* | 7/2014 | Brooker | G06F 21/44 726/6 |
| 2014/0237550 A1* | 8/2014 | Anderson | H04L 63/0807 726/22 |
| 2015/0007274 A1* | 1/2015 | Chang | G06F 21/78 726/4 |
| 2015/0082373 A1* | 3/2015 | Kottahachchi | G06F 21/30 726/1 |
| 2015/0135257 A1* | 5/2015 | Shah | H04L 63/105 726/1 |
| 2015/0341368 A1* | 11/2015 | Roth | G06F 21/00 726/4 |
| 2016/0373481 A1* | 12/2016 | Sultan | H04L 63/1433 |
| 2017/0078325 A1* | 3/2017 | McGloin | H04L 63/1425 |
| 2017/0083370 A1* | 3/2017 | Mantere, III | G06F 9/5005 |
| 2017/0223057 A1* | 8/2017 | Amiri | H04L 67/306 |
| 2017/0331832 A1* | 11/2017 | Lander | H04L 63/102 |
| 2017/0359327 A1* | 12/2017 | Kottahachchi | H04L 63/08 |
| 2018/0115587 A1* | 4/2018 | Roth | H04L 63/20 |
| 2018/0234462 A1* | 8/2018 | Kruse | H04L 63/10 |
| 2018/0275765 A1* | 9/2018 | Roth | H04L 63/083 |
| 2018/0302443 A1* | 10/2018 | Weiss | G06F 21/604 |
| 2018/0316676 A1* | 11/2018 | Gilpin | H04L 9/0891 |
| 2018/0336360 A1* | 11/2018 | Kolishchak | G06F 21/604 |
| 2019/0098056 A1* | 3/2019 | Pitre | G06F 21/6218 |
| 2019/0238424 A1* | 8/2019 | Guan | G06F 16/2379 |
| 2019/0238467 A1* | 8/2019 | Guan | H04L 63/0227 |
| 2020/0076819 A1* | 3/2020 | Spurlock | G06F 21/10 |
| 2020/0204463 A1* | 6/2020 | Guan | G06F 21/604 |
| 2020/0366707 A1* | 11/2020 | Cook | H04L 9/40 |
| 2021/0014273 A1* | 1/2021 | Kipp | H04L 67/563 |
| 2021/0014274 A1* | 1/2021 | Monni | H04L 63/20 |
| 2021/0067526 A1* | 3/2021 | Fahrny | G06F 21/64 |
| 2021/0075794 A1* | 3/2021 | Gazit | H04L 63/1408 |
| 2021/0084044 A1* | 3/2021 | Choyi | H04L 63/102 |
| 2021/0173919 A1* | 6/2021 | Kolishchak | G06F 21/6281 |
| 2021/0352107 A1* | 11/2021 | Monni | H04L 63/20 |
| 2021/0392142 A1* | 12/2021 | Stephens | H04L 63/104 |
| 2021/0409218 A1* | 12/2021 | Elmenshawy | H04L 9/16 |
| 2021/0409219 A1* | 12/2021 | Elmenshawy | H04L 9/3228 |
| 2021/0409345 A1* | 12/2021 | Elmenshawy | G06F 21/44 |
| 2022/0060513 A1* | 2/2022 | Gattu | H04L 63/102 |
| 2022/0075771 A1* | 3/2022 | Li | G06F 16/24544 |
| 2022/0158943 A1* | 5/2022 | Jain | H04L 45/745 |
| 2022/0188448 A1 | 6/2022 | Levit et al. | |
| 2022/0303313 A1 | 9/2022 | Gargaro et al. | |
| 2022/0337593 A1* | 10/2022 | Burckhardt | H04L 63/101 |
| 2022/0350880 A1* | 11/2022 | Cruanes | G06F 21/54 |
| 2022/0368695 A1* | 11/2022 | Upton | G06F 9/547 |
| 2023/0090190 A1* | 3/2023 | lila | H04L 63/20 |
| 2023/0164189 A1* | 5/2023 | Danilchenko | H04L 63/102 726/1 |
| 2023/0179634 A1* | 6/2023 | Seaborn | H04L 63/10 726/1 |
| 2023/0283644 A1* | 9/2023 | Yancey | H04L 63/101 726/1 |

* cited by examiner

AUTHORIZING ACCESS TO OPERATING SYSTEM RESOURCES USING SECURITY POLICIES MANAGED BY SERVICE EXTERNAL TO THE OPERATING SYSTEM

CROSS-REFERENCE TO RELATED APPLICATIONS

This application is related to and incorporates by reference for all purposes the full disclosure of U.S. patent application Ser. No. 17/457,635 filed Dec. 3, 2021 now U.S. Pat. No. 11,880,483 issued Jan. 23, 2024, entitled "AUTHORIZING ACCESS TO DATABASE SYSTEM RESOURCES USING SECURITY POLICIES MANAGED BY SERVICE EXTERNAL TO THE DATABASE SYSTEM," U.S. patent application Ser. No. 17/457,642 filed Dec. 3, 2021 now U.S. Pat. No. 11,943,261 issued Mar. 26, 2024, entitled "CLOUD-BASED SECURITY SERVICE FOR IMPROVED COMPLIANCE OF MAINFRAME WORKLOADS," and U.S. patent application Ser. No. 17/457,630 filed Dec. 3, 2021, entitled "CLOUD-BASED MAINFRAME SERVICE," filed concurrently herewith.

BACKGROUND

The security of computing resources and associated data is of high importance in many contexts. Access to computing resources may be managed using a variety of different techniques. In the context of a computing resource service provider, there may be multiple components that are used to manage access to various resources. For example, an operating system may have various permissions associated with various OS-level users, a database system may allow database administrators to grant and revoke security privileges on database resources to specific users and roles, and so forth. Managing security models of a computing resource service provider as well as managing the security of resources within the computing resource service provider can be complex and present many challenges to users.

Figure 1:
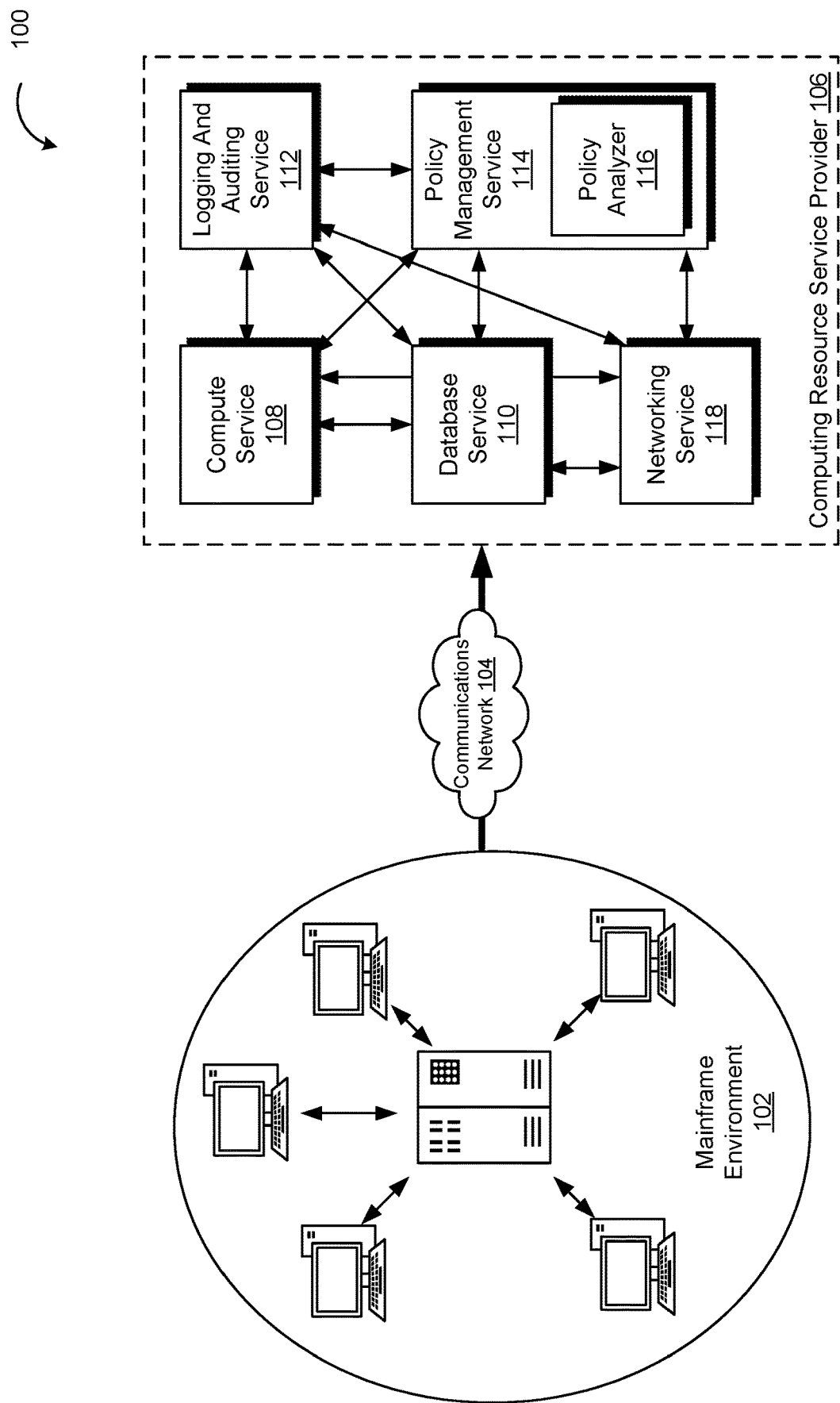
FIG. 1 illustrates a computing environment in which a mainframe workload is migrated to a cloud-based service provider, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for migration of mainframe workloads into a computing resource service provider and ensuring the security of such workloads on the computing resource service provider.

Example embodiments described herein provide certain systems, methods, and devices for managing security policies on behalf of an operating system using an external policy management service to control access to OS-level resources.

Example embodiments described herein provide certain systems, methods, and devices for managing security policies on behalf of a database system using an external policy management service to control access to database-level resources.

Example embodiments described herein provide certain systems, methods, and devices for analyzing security policies of a mainframe workload implemented in the context of a computing resource service provider and mathematically proving whether the mainframe workload complies with various regulatory constraint, certification requirements, etc.

Techniques described herein may be used to efficiently describe, enforce, manage, and monitor the security of compute services in a way that allows for end-to-end management of workloads using a policy management service. The policy management service supports a flexible security definition that can be used to provide for finer-grained security, as well as enforcement that is not otherwise natively supported by operating systems, according to various embodiments.

According to various embodiments, an external policy management service is used to control access to operating system (OS)-level resources. Various Linux and Unix-based operating systems have shortcomings in their supported security models. For example, in Linux/Unix, a command such as chmod may be used to set the permissions on a resource managed by the OS, such as a file. However, chmod is limited to specifying three different sets of permissions on a file resource—for a user, a group, and others. This may result in a difficult-to-implement security model where generating customized permissions for different users to access is cumbersome. In contrast, various embodiments described herein are used to provide customized security policies for any number of users, groups, roles, or other types of principals via an external policy management service. For example, policy management services may be used to provide multiple user-specific security policies and/or multiple group-specific security policies on a file or other OS-managed resource.

An operating system is provisioned with a kernel-mode authorization interceptor, according to various embodiments. When an application attempts to utilize various OS-level resources, such as accessing a file, the application's file access attempt may be routed to the kernel via a system call. The system call may be evaluated in kernel space by an authorization intercept that determines whether to authorize access to OS-level resources using security policies that are maintained in a policy database managed by an external entity, such as policy management services described in greater detail below. In various embodiments, the security policy format of the policy management service is used to define security policies that apply an effect for a given principal (e.g., user), resource, action, and (optionally) condition. The system call may be parsed to extract a request context, and this request context may be evaluated against a set of applicable security policies to determine whether access to the requested OS-level resource should be granted. In some embodiments, a policy evaluation request is sent from the kernel-mode authorization interceptor to a policy management service to perform the policy evaluation. However, in other cases, the security policies managed by the policy management service may be cached in the kernel to improve system performance and responsiveness. Accordingly, in such embodiments, policy evaluation may be performed directly in kernel space.

Techniques described herein may be used to efficiently describe, enforce, manage and monitor the security of database services (relational database management systems) in a way that allows an end-to-end management of security. Security policies for a database system are managed externally by a policy management service that can be used to provide singular view onto the entire security of a workload that utilizes multiple resources and/or types of resources of a service provider. In various embodiments, the techniques for managing database resources using an external service can be used to provide for finer-grain security (time-wise and feature-wise) as well as an enforcement on database management system (DBMS) features that are usually not individually secured as such.

According to at least one embodiment, DBMS security permissions are defined in a policy database managed by a policy management service. Existing APIs may be used to define the database-related security policies, but is applied as a new type of service provider resource with new types of actions that can be performed. For example, supported actions on a database tables may include DELETE, INSERT, REFERENCES, SELECT, and UPDATE. These definitions may use regular expressions as needed on the resources to simplify the definition (e.g., "Deny Table schemaX.*" may indicate to deny access to any part of the database schema "schemaX." Security enforcement in the DBMS is achieved through the use of security hooks that reprogram and extend the original security features of the DBMS. For example, all security code calls are wrapped, according to at least one embodiment, and external security policies from a policy database are used to determine whether access to various database resources should be granted.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates a computing environment 100 in which a mainframe workload is migrated to a cloud-based service provider, according to at least one embodiment. In at least one embodiment, mainframe environment 102 refers to a combination of computer hardware and software that is typically owned and operated by an organization to run mainframe workloads. These workloads may be executed on-premises, or in a hybrid cloud environment in which some aspects of a mainframe workload are offloaded (e.g., to a cloud service provider) but important and/or sensitive portions of the workload continue to be executed on local machines.

Mainframe environment 102 may be used to run workloads that are mission-critical and process highly valuable and confidential data to its owners or customers thereof. Mainframe environment may comprise authentication, authorization & traceability/auditability components that may be important for sensitive applications, which may be used in the context of highly regulated industries such as the financial services industry or related fields. Security mechanisms and their observability may be implemented to satisfy regulatory and/or compliance needs. Examples of mainframes may include zOS-based mainframe systems. Security on mainframes is ensured in most cases by one of IBM's RACF (Resource Access Control Facility), TopSecret, and ACF2. Each of these is used to ensure "technical" security (access control to files, databases, files, computing resources, etc.) and also some functional security (rights to execute some transactions, to access some specific system services, etc.).

As described in greater detail below, various techniques described herein are implemented in various embodiments to migrate mainframe workloads from a mainframe environment 102 into a computing resource service provider 106 environment. Computing resource service provider may be a service that can be accessed via communications network 104 and provides various computing resource related capabilities. A computing resource service provider may host or otherwise provide capabilities related to various computing resources, such as database resources, compute resources, data storage resources, and the like. Customers of a computing resource service provider can, accordingly, utilize the various services provided by the computing resources service provider 106 without onerous investment into computer servers and hardware. Rather, these resources are provided as services to customers of the computing resources service provider, which manages such resources on behalf of the customers.

Mainframe workloads may be migrated from an on-premises mainframe environment 102 to a highly available computing resource service provider 106. In various embodiments, mainframe workloads are migrated to computing resource service provider 106 and the computing resource service provider 106 utilizes computing service 108 to provision and run virtual machine instances that are loaded with operating systems that are customized with kernel-mode components that use a policy management service 114 to implement the OS-level security model. A database service 110 likewise uses policy management service 114 to implement an authorization system that grants and/or revokes access to database-level resources, such as tables and procedures. Logging and auditing service 112 may likewise be implemented for traceability/auditability and to maintain an activity log of the migrated workloads. Policy analyzer 116 is, in some embodiments, implemented as a component or feature of policy management service 114. Policy analyzer 116 may utilize various mathematical models to mathematically prove various security aspects of migrated workloads. A Satisfiability Modulo Theories (SMT)-based solver may be used to prove that certain security assurances are met by the computing resource service provider 106. For example, policy analyzer 116 can mathematically prove whether a reference policy (e.g., representing a regulatory constraint or a certification requirement) is satisfied by the migrated workload environment. This may be accomplished by using policy analyzer to prove that the security policies implemented in policy management service 114 are either equivalent to or less permissive than the reference policy representing a constraint or requirement.

Networking service 118 may be a service offered by computing resource service provider that implements virtual private cloud (VPC) capabilities. Networking service 118 may provide web-based frontend capabilities. In some embodiments, networking service 118 is used to provision a logically isolated section of computing resource service provider 106 wherein customers are able to access various resources within a VPC using an IPsec based virtual private network (VPN). Security policies that facilitate the access and use of networking service 118 may be stored in a policy database and managed by policy management service 114.

It should be noted that components described in connection with FIG. 1 and example implementations utilizing such components are described in greater detail below.

Figure 2:
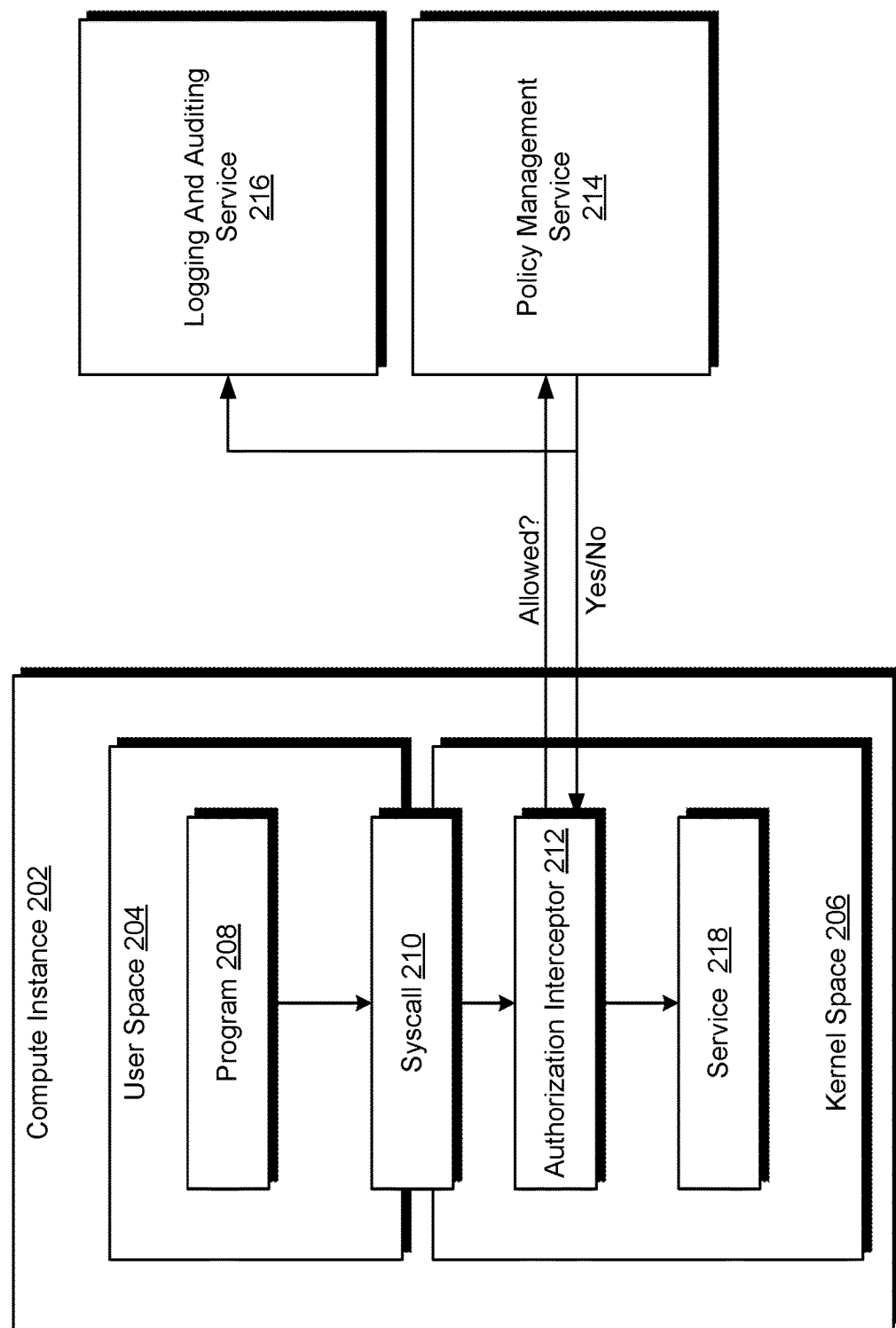
FIG. 2 illustrates a computing environment in which service-based security enforcement of a compute instance is implemented, in accordance with one or more example embodiments of the present disclosure.

FIG. 2 illustrates a computing environment 200 in which service-based security enforcement of a compute instance is implemented, in accordance with one or more example embodiments of the present disclosure.

In at least one embodiment, compute instance 202 refers to a virtual machine instance that is executing in the context of a computing resource service provider. Compute instance 202 may be used to launch various software applications, provide compute-related functionality, and so forth. A compute instance 202 may be a virtual machine instance that is provisioned and launched in the context of a compute service of a computing resource service provider. A compute instance 202 may be provisioned and launched on behalf of a client. A client of computing resource service provider may launch a compute instance to run a mainframe workload or other software-based functionality.

In various embodiments, compute-service is provisioned with an operating system. An operating system may be used to run various software programs and applications, such as program 208 depicted in FIG. 2. Program 208 may be launched as a process in user space 204 or user mode. User space 204 may refer to executable code that runs outside of the operating system's kernel. Executable code running in user space 204 may include various programs, libraries, services, etc. that interact with the kernel. Processes running in user space 204 may make application programming interface (API) calls that transition from user mode to kernel mode to access CPU, memory, hardware devices, and so forth.

Kernel space 206 may refer to the core of the operating system. The kernel may be used to control hardware resources (e.g. I/O, memory, Cryptography) via device drivers, arbitrate conflicts between processes concerning such resources, and optimize the utilization of common resources e.g. CPU and cache usage, file systems, and network sockets. Executable code running in kernel mode may run in a supervisor mode that is trusted to interact with and control hardware components, such as CPU, memory, and other hardware devices.

Program 208 may refer to a software-based program that runs in user mode. A user-mode application may be an executable program that is launched by a user (e.g., administrator or other user) of the operating system and may be used to implement various functionality, such as running mainframe workloads. Program 208 may access various computing resources. For example, program 208 may access or attempt to access files in the operating system. Files may be stored locally (e.g., on the same logical and/or physical disk as the operating system) or may be stored remotely (e.g., on a network drive).

In various embodiments, access to computing resources is granted or denied based on a security model. An operating system may be able to specify various operating-system level permissions for resources under the control of the operating system. For example, an operating system may support setting permissions that restrict or define a user's ability to access a file. A user may be allowed to have various combinations of read, write, and execute privileges. An operating system may allow users to be part of a group. In various embodiments, techniques described herein may be used to enforce external security policies. As described herein, an external security policy may refer to a policy that is not managed natively by an operating system to control access to resources of the operating system-rather, an external policy may be managed by a separate computing entity, such as policy management service 214 depicted in FIG. 2, in accordance with at least one embodiment.

A system call 210 (e.g., Linux syscall) may refer to a command, operation, interface etc. that a user mode computer program requests a service from the kernel of the operating system on which it is executed. A program may invoke system call 210 to access a file stored on a hard disk drive, launch a child process (e.g., using a CPU), utilize other hardware, and so forth. A system call 210 may be used to transition execution of code from user space 204 to kernel space 206. System call 210 may transfer control from user space to kernel space using an architecture-specific feature. For example, software interrupts or traps may be used to transfer control to an operating system kernel.

Authorization interceptor 212 may refer to a kernel-mode component that an operating system is provisioned with when the operating system is launched. The operating system running on compute instance 202 may be different from a stock version in at least this respect. In various embodiments, authorization interceptor 212 runs in kernel space and cannot be deactivated by user mode operations. In some embodiments, an elevated privilege is required to access or otherwise configure authorization interceptor 212 once it has bene provisioned. One such example may be where a token or other permission grant is provided by policy management service 214 that allows for the authorization interceptor 212 to be accessed on compute instance 202. One such example of an authorization interceptor 212 that runs in kernel space 206 is extended Berkeley Packet Filter (cBPF).

In various embodiments, authorization interceptor 212 is a kernel mode software component (e.g., executable or library) that runs opaquely, such that user mode processes such as program 208 are not able to determine its existence. Authorization interceptor 212 may be used in place of—or in addition to—an operating system's native security features to provide authorization functionality in the context of the operating system. In at least one embodiment, authorization interceptor 212 bypasses an operating system's native security features and instead uses policy management service 214 to perform authorization checks to determine whether and/or how to process system calls. In various embodiments, authorization of system calls involves determining a request context and providing the request context to policy management service 214. Policy management service 214 may be a service of a computing resource service provider that is used to bind policies to principals, and may be used to determine whether access to computing resources should be granted. In at least some embodiments, policy management service 214 is extended to manage access to not only computing resources that are controlled and/or managed by the computing resource service provider, but also computing resources that are controlled and/or managed by an operating system running on compute instance 202. Policy management service 214 described in connection with FIG. 2 may be used to store security policies that control the access to various resources controlled by operating systems, database management systems, and so forth.

In at least one embodiment, authorization interceptor 212 is used to determine whether and/or how the kernel processes system call 210. In at least one embodiment, authorization interceptor 212 detects system call 210, determines a request context, and submits the request context to policy management service 214 for evaluation. Policy management service 214 may evaluate the request context, determine whether the request should be authorized, and then provide an indication of whether to grant or deny access. Authorization interceptor 212 may receive a response from policy management service 214 indicating whether system call 210 should be fulfilled or denied, and system call 210 may be processed according to such an indication.

A request context may be determined by authorization interceptor 212. A request context may include information regarding a system call or other access request that may be used by policy management service 214 to evaluate whether a grant of access to the requested resources is permitted. For example, a request context may include various information, such as a user or principal that is making the system call, one or more OS-level resources which would be accessed in fulfillment of the system call, the nature of the access (e.g., whether read, write, and/or execute privileges would be needed), and so forth. In some embodiments, a system call may involve access to multiple OS-level resources. For example, if a system call is made to delete a directory and files/sub-directories, then permissions to write each file and sub-directory (and files contained therein) may be required to successfully delete the directory.

In various embodiments, determining a request context comprises performing a mapping between OS-level privilege concepts and computing resource service provider-level privilege and concepts. For example, a file within the context of an operating system may be described by a full or relative filepath—e.g., "/home/ExampleUser/data/ExFile.dat" in Linux or "C:\users\ExampleUser\data\Exfile.dat" in Windows. Within the context of a computing resource service provider, these OS-level paths may be decorated with additional information specifying a workload or execution context that further disambiguates the resource from other resources of other users.

Likewise, an OS user may be associated with a service provider-level user. For example, an operating system user name may be mapped to service provider resource name that corresponds to the operating system user. In some embodiments, a service provider user name may be decorated with a use context (e.g., workload associated with compute instance 202) that uniquely resolves to a specific OS-level user. In some embodiments, the user name may be described in the following format:

rn:web-service:identity-manager::account-id:user/user-name

The user name may be nested or otherwise encoded a use context indicating that the service provider-level user name is associated with an OS-level user that is used to perform workloads on a compute instance. In some embodiment, the OS-level use is encoded as part of the user name, indicating a resource or type of resource (e.g., compute instance) that the user name is used for:

rn:web-service:identity-manager::account-id:user/compute-instance/OS-user-name

In some embodiments, the principal includes or otherwise encodes information regarding the workload that the operating system is being used for, such as a mainframe workload.

A request context may comprise principal information, resource information, action information, etc. In some embodiments, a request context includes additional information such as request time stamp, location information, and so forth, which may be used as part of an authorization and/or authentication process. Principal information may refer to a caller entity, which may be a user, role, group, etc. that is making a system call. Resource information may refer to one or more OS-level resources for which access is being requested via the system call. Action information may refer to a type of access to the resource that is being requested by the system call, such as access to read, write, or execute a file. A bitmask may be used to specify different combinations of actions that may be requested. A bit value of 1 may denote a grant of permission, whereas a bit value of 0 may denote a denial of permission. Bitmask positions may refer to different actions (e.g., read, write, execute). Actions may be described as operating system or compute instance level actions, for example, a wild card "OS:*" action may indicate that all OS-level permissions should be allowed.

Authorization interceptor 212 may transmit a request context to policy management service 214. As noted before, compute instance 202—which authorization interceptor executes on—as well as policy management service 214 may be running within the context of a computing resource service provider that hosts and/or otherwise provides various computing-related services. Computing resource service provider may be used to run mainframe application workloads in the context of an off-premises computing resource service provider.

A policy management service 214 may provide access to, and administration of, policies applicable to requests for access to computing resources (e.g., web service application programming interface requests). For example, the policy management service may receive information sufficient for selecting policies applicable to pending requests. In some embodiments, the information may be copies of the requests, or may be information generated based at least in part on the requests. For example, a service frontend may receive a request for access to resources and may generate a query to the policy management service based at least in part on information specified by the request.

In some embodiments, authorization interceptor comprises or otherwise operates in concert with an authorization module that is used to compare the request to the one or more permissions in the policy to determine whether service may satisfy the request (i.e., whether fulfillment of the request is authorized). For example, the authorization module may compare an API call associated with the request against permitted API calls specified by the policy to determine if the request is allowed. If the authorization module is not able to match the request to a permission specified by the policy, the authorization module may execute one or more default actions such as denying the request, and causing the denied request to be logged in the logging and auditing service 218. If the authorization module matches the request to one or more permissions specified by the policy, the authorization module may resolve this by selecting the least restrictive response (as defined by the policy) and by providing an indication of whether the fulfillment of the request is authorized (i.e., complies with applicable policy) based on that selected response. In some embodiments, the authorization module is a separate service provided by the computing resource service provider and the authorization interceptor 212 of compute instance 202 may communicate with the authorization module over a network.

Accordingly, if authorization interceptor 212 or another appropriate kernel-mode component determines that the system call 210 should be fulfilled, then service 218 may be invoked. In this context, service 218 may refer to kernel-mode software that provides a service or implements functionality related to the compute instance and/or operating system. For example, file system related services may be implemented by service 218 whereby an OS-level user may access files with various privileges, such as read-only privileges, read-write privileges, execute privileges, and so forth.

Logging and auditing service 216 may refer to a service of a computing resource service provider that performs logging and auditing services. While not depicted in FIG. 2, other embodiments may be implemented with logging and auditing performed by separate services, or implemented with one but not the other. In various embodiments, each permissions request that is sent by authorization interceptor 212 and each response to such request may be recorded or otherwise logged by logging and auditing service 216. Logging and auditing service 216 may be a single point in which permission requests across multiple computing resources and/or types of computing resources within a computing resource service provider are collected and aggregated. For example, a mainframe workload may involve file access requests on an operating system (e.g., running on a compute instance of a computing resource service provider) and database query requests to access records stored in a database (e.g., database service offered by computing resource service provider), and so forth. Each of these requests may be recorded and aggregated together by logging and auditing service 216. A technical benefit of aggregating activity logs across all resources used in a workload (e.g., mainframe workload) is that comprehensive auditing may be performed—for example, tracing data lineages and following the flow of data from one subsystem to another subsystem. This may be used to ensure the confidentiality and/or security of data is preserved throughout an entire workload, for performing forensic analysis of where data is available or has been made available, and so forth.

FIG. 2 depicts an authorization interceptor 212 implemented in the context of a compute service in which system calls of importance are intercepted and an external policy management service is used to provide fine-grained access management. Compute services described herein may include virtual machine instances, containers, serverless compute resources, and so forth. Generally speaking, the compute instance may be any suitable type of compute resource in which a kernel of an operating system can be re-programmed or modified to intercept system calls.

Figure 3:
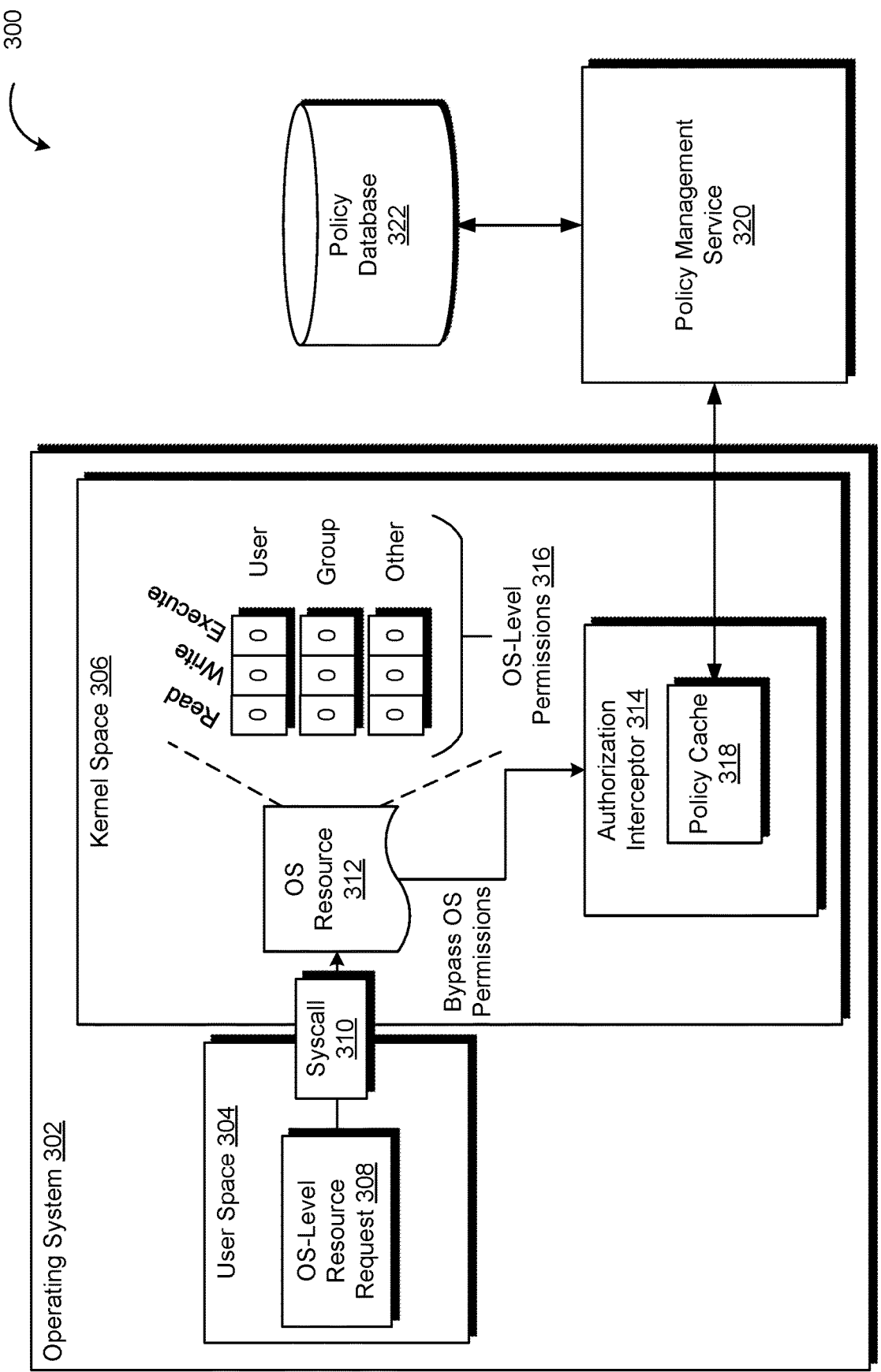
FIG. 3 illustrates a computing environment in which access to an OS-level resource is authorized using a policy management service, in accordance with one or more example embodiments of the present disclosure.

FIG. 3 illustrates a computing environment 300 in which access to an OS-level resource (e.g., a file) is authorized using a policy management service, in accordance with one or more example embodiments of the present disclosure.

In at least one embodiment, operating system 302 refers to software running on a hardware machine, virtual machine, etc. Operating system 302 may run on virtualized hardware or physical hardware. For example, operating system 302 may be provisioned and launched on a virtual machine instance of a compute service that is hosted or otherwise operated by a computing resource service provider. Operating system 302 may be system software that manages computer hardware (e.g., physical or virtualized), software resources, and provides common services for computer programs. Operating system may include a user space 304 and kernel space 306.

User space 304 may refer to code that runs outside of an operating system's kernel. Programs and applications, such as mainframe workloads, may be executed in user space 304. Typically, applications running in user space 304 have their own virtual memory space and, unless explicitly allowed, cannot access memory of other processes. The segregation of processes may be the basis or memory protection, as it prevents processes from viewing the memory contents and state of other processes, unless explicitly allowed (e.g., through shared memory or inter-process communications). Programs running in user space 304, such as mainframe applications, may make use of operating system resources. For example, a program can read from a file stored on a disk drive that is managed by the file system of operating system 302. OS-level resource request 308 may refer to a request to access a file, which may include data and/or executable code, for example. OS-level resource request 308 may be a user-mode function or application programming interface (API).

In various embodiments, a kernel-mode transition is used to process a user-mode requests. A system call 310 may refer to a command or function that is programmatically invoked by a program to request a service from the kernel of an operating system. OS resource 312 may refer to a resource managed by an operating system, such as a file, hardware resources, and so forth. System call 310 may encode or otherwise indicate an operation to perform on OS resource 312. For example, system call 310 may indicate that an application is requesting to open a file for read-only access, read-write access, and so forth. System call 310 may include information relating to a user account that submits OS-level resource request 308.

Authorization interceptor 314 may be used to determine whether and/or how to process system call 310. Authorization interceptor 314 may be used in place of OS-level permissions 316 in various embodiment. OS-level permissions 316 may refer to permissions or policies relating to resources managed by operating system 302. OS-level permissions 316 may provide different levels of access to OS resource 312. In various embodiments, operating system 302 allows for different levels of permissions to be set based on user, group, and other. For example, in Linux, files and directories are OS-level resources that are owned by a user (e.g., the user that created a file), and may be assigned to a group, which defines the resource's group class, and an other class that encompasses users that are not the owner and also not a member of the group.

According to at least one embodiment, when system calls are made, authorization interceptor 314 is used to perform authorization checks within kernel space 306 to determine whether the system call 310 should be successfully fulfilled. In some embodiments, all system calls require authorization interceptor 314 to successfully verify that the system call is authorized. Authorization to access OS-level resources may be performed using an external policy management service 320. For example, operating system 302 may be running on a virtual machine instance of a compute service of a computing resource service provider that also provides identity and/or access management capabilities via policy management service 320.

Policy management service 320 may be in accordance with those described elsewhere, such as those discussed in connection with FIG. 16. In various embodiments, authorization interceptor 314 uses system call 310 to determine a request context. Applicable security policies managed by policy managements service 320 and stored in policy database 322 may be used to evaluate whether the user making the system call has sufficient rights. Request context may be used to determine applicable policies, which may be evaluated in the context of the system call 310 to determine whether or not access to OS resource 312 should be granted.

Authorization interceptor 314 may have an internal policy cache 318 that replicates the OS-specific security policies that are managed by policy management service 320. To obtain policies applicable to the request, the authorization interceptor 314 may transmit a query to a policy database 322 managed by a policy management service 320. The query to the policy database 322 may be a request comprising information sufficient to determine a specific operating system context, such as an identifier associated with a mainframe workload that the operating system is being used to run. Authorization interceptor 314 may receive the security policies pertinent to the specific execution context and store them in policy cache 318. For example, a policy managed by policy management service 320 may indicate that the user making the OS-level resource request 308 has read-only privileges to OS resource 312. Accordingly, in this example, if OS-level resource request 308 is made by the user to read the resource, the request will be granted; however, if the user requests read-write access, the request will be denied.

Operating system 302 may be provisioned such that authorization interceptor 314 is used to perform access and security related checks that determine whether and/or how access to resources managed by operating system 302 are granted. In various embodiments, a customer of a computing resource service provider may specify whether compute instances should use native security authorization systems or use policy management service 320 to perform authorization processes. For example, a client of a computing resource service provider may indicate (e.g., as a setting in a management dashboard) that security of operating system 302 should be centrally managed, then compute instances may be launched with a customized version of the operating system (e.g., operating system 302 depicted in FIG. 3) that is pre-loaded with authorization interceptor 314 in the kernel. In some embodiments, operating system 302 is configured with OS-level permissions that deny access to all resources.

In various embodiments, users of operating system 302—even including administrators—are not sufficiently privileged to perform operations that change the behavior of authorization interceptor 314. For example, in customized operating system 302 pre-loaded with authorization interceptor 314, it would not be possible to remove authorization interceptor 314 or change the behavior of the kernel to perform authorization checks using the local operating system's security policies rather than by using policy management service 320. In various embodiments, operating system 302 is configured in this manner to prevent policy management service 320 from being bypassed to allow for provably security tools to be used. These tools may be used to mathematically prove various assertions that pertain to resources-such as OS-level resources. For example, an SMT-based solver is used, in at least one embodiment, to review security policies managed by policy management service 320 to mathematically prove that the security policy database 322 are equivalent to a reference policy. This type of mathematically sound policy analysis may be used to prove, in a mathematical sense, that the security policies implemented in policy management service 320 are either equivalent to or less permissive than a reference policy, which can be used to comply with data security requirements, for example, as required for auditing, certification, or other needs.

Figure 4:
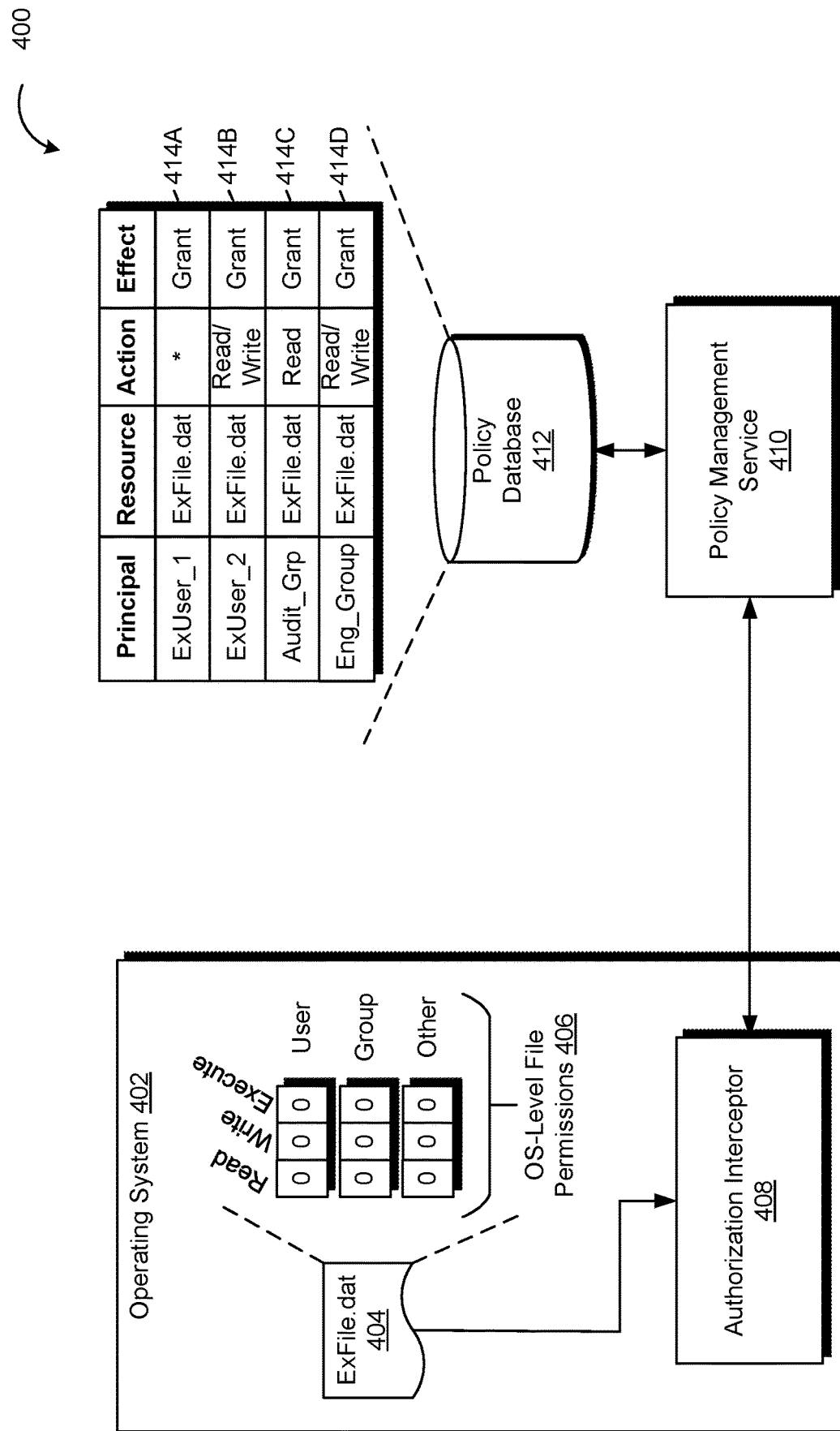
FIG. 4 illustrates a computing environment in which security policies for an operating system are externally managed by a policy management service, in accordance with one or more example embodiments of the present disclosure.

FIG. 4 illustrates a computing environment 400 in which security policies for an operating system are externally managed by a policy management service, in accordance with one or more example embodiments of the present disclosure.

In various embodiments, operating system 402 comprises various components, such as a kernel that is used by applications to interface with hardware (e.g., physical hardware or virtualizations thereof). Operating systems typically implement a security model and manage access to resources managed by the operating system. For example, an operating system may be used to manage permissions for a file stored on a hard disk drive. For example, a file such as file 404 depicted in FIG. 4 may have OS-level file permissions 406 that indicate how various entities within operating system 402 can access the file. For example, a Linux-based environment may allow for privileged users to use a command (e.g., chmod) to set read, write, and execute permissions on a file for a user, group, and others. This type of security model may have various shortcomings. For example, in Linux, chmod is a command that a privileged user can use to specify permissions for a file. The file may be configured with different permissions for a file owner (e.g., a specific user), a group, and others. As an example, an owner of a file may have full access rights to read, write, and execute the file, and a specific group such as an audit group may be given read-only permission to view the contents of the file but not modify it. Additionally, access to other users may be denied, unless otherwise specified (e.g., a deny-by-default stance).

As discussed above, an operating system such as Linux may have various shortcomings with respect to its security model. One such shortcoming may be that Linux allows only one user and one group to own a file. Linux/Unix commands such as chmod are limited to specifying three different sets of permissions on a file resource—for a user, a group, and others. This may result in a difficult-to-implement security model where generating customized permissions for different users to access is cumbersome. In contrast, various embodiments described herein can be implemented so that operating system 402 is able to provide a customized security policy for any number of users, groups, roles, or other types of principals via an external policy management service 412. For example, policy management service 410 may be used to provide multiple user-specific security policy and/or multiple group-specific security policies on a file or other OS-managed resource.

A role may be an identity within a computing environment with permission policies that may be used to determine a set of capabilities that the role is capable of performing within the context of the computing environment. The permissions may include rights to access data resources (e.g., rights to create, read, update, and delete a file) as well as access to services (e.g., rights to make an API request and have the request fulfilled by a service) as well as other rights (e.g., administrative rights in a computer system to grant or revoke permissions to users). However, a role is not necessarily uniquely associated with an underlying user or identity and may be assumable by anyone who has a permission to assume the role. In some cases, access keys are dynamically created when a role is assumed. Roles may be used as a mechanism to facilitate access to resources with temporary security credentials for the role session. This means that the time-oriented granularity of security is improved: a user will receive credentials on some mainframe resource only for the duration of the role session rather than forever. This is an improvement on standard mainframe security where privileges are usually granted for an indefinite period of time.

In at least one embodiment, a security model of an operating system is implemented using an external policy management service, as depicted in FIG. 4. In various embodiments, authorization to access file 404 is managed using an external service, such as policy management service 410 depicted in FIG. 4. For example, if an application running within the context of operating system 402 attempts to access file 404, a file access request may be processed using authorization interceptor 408. Authorization interceptor 408 may be a software component that is always running in the kernel of operating system 402 and intercepts system calls to the kernel of operating system 402. When system calls or other user-to-kernel calls are made, those calls may be routed to authorization interceptor 408 and then authorization interceptor is used to determine whether access to various resources managed by operating system 402 should be granted.

Authorization interceptor 408 may be used to process system calls from applications in user space. When a user-mode application makes various API calls, a kernel mode transition may be facilitated via system calls. Once in kernel mode, system calls may be routed to authorization interceptor 408, and then authorization interceptor 408 uses policy management service 410 to validate whether access to various resources needed to fulfill the system call are permitted, according to at least one embodiment. Authorization interceptor 408 may submit an API request to policy management service 410 within the context of a computing resource service provider that retrieves one or more applicable security policies from policy database 412, which may be used to evaluate whether a grant of access should be permitted to operating system 402 resources as part of fulfilling the system call.

In various embodiments, policy database 412 is used to store security policies that pertain to a resource. Policy database 412 may be used to manage security policies for resources directly managed by a computing resource service provider (e.g., compute services, data storage services, database services, etc. offered by computing resource service provider to customers). In at least one embodiment, policy database 412 stores security policies for OS-level resources, such as files of operating system 402 running on a virtual machine instance hosted by computing resource service provider, as depicted in FIG. 4

Security policies of policy database 412 may be used to define permissions for how resources can be accessed. For example, multiple security policies 414A-D may be applicable to file 404, which is an OS-level resource. A security policy may comprise a principal, resource, action, and effect. In some embodiments, a security policy further comprises a condition that indicates when the security policy is applicable—for example, certain security policies may be applicable only at certain times (e.g., weekdays, during standard business hours, and so forth).

Multiple security policies may be defined to control access to an OS-level resource. For example, a first security policy 414A may apply to a first OS user that grants all privileges to that user. For example, these privileges may include OS-level read, write, and execute privileges. A second security policy 414B may apply to a second OS user and grant that user a different set of privileges, such as read and write access to the resource. Likewise, security policies may be defined for groups or other types of principals, such as roles. Security policy 414C may be applicable to an audit group that grants users of that group read-only access to file 404. Additionally, security policy 414D may grant another group a different set of OS-level privileges to a different group. In this way, security policies can be customized to provide multiple users and/or multiple groups with different levels of access to OS-level resources and may be used to extend the security capabilities of operating system 402.

In various embodiments, OS-level privileges are gathered as groups and granted as a whole through the group instead of individually, which may be done to increase the efficiency of security management and ensure consistent application of security policies across a set of users. A privilege group can be designed and ordered to further improve security, wherein a second privilege can only be used after a first privilege is used—this means if access to the second privilege is improperly obtained (e.g., by a hacker or malicious user), that access to sensitive resources is still denied.

Figure 5:
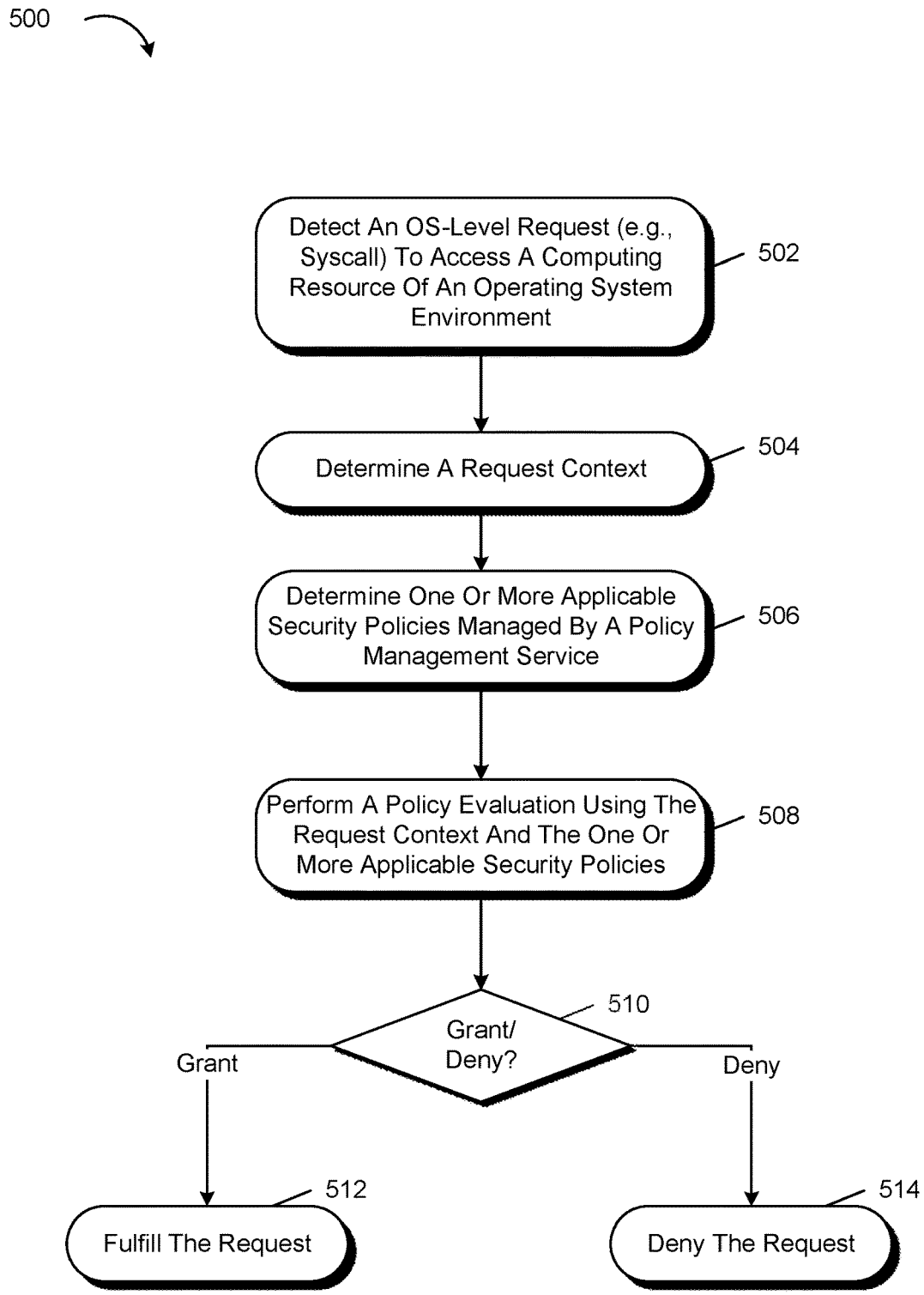
FIG. 5 shows an illustrative example of a process for managing security policies on behalf of an operating system, in accordance with one or more example embodiments of the present disclosure.

FIG. 5 shows an illustrative example of a process 500 for managing security policies on behalf of an operating system, in accordance with one or more example embodiments of the present disclosure. In at least one embodiment, some or all of the process 500 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 500 may be implemented in the context of various systems and methods described elsewhere in this disclosure, such as those discussed in connection with FIGS. 2-4 and 17. In at least one embodiment, process 500 or a portion thereof is implemented by a computing resource service provider.

In at least one embodiment, process 500 comprises a step to detect 502 an OS-level request to access a computing resource of an operating system environment. The OS-level request may be detected in the kernel space of an operating system, for example, by an authorization interceptor module that runs as a critical component of the operating system. In various embodiments, an authorization interceptor receives and processes system calls from applications in user space to determine whether to grant access to various resources managed by the operating system.

In at least one embodiment, process 500 comprises a step to determine 504 a request context. Determining a request context may involve determining a principal, a resource, and an action. A principal may refer to the entity that is requesting a specific action to be performed. The principal may be an OS-level user, a role that a user may assume by receiving a time-sensitive token from a computing resource service provider that has certain rights associated with it, and so forth. A resource may refer to an OS-level resource that is managed by the operating system, such as files and directories. An action may refer to a type of action that is being requested. This may involve read, write, execute, etc. rights, and different users may have different permissions based on their needs. For example, an audit team within a business organization may need read access rights in order to determine compliance with various internal and external rules and regulations.

In various embodiments, OS-level and/or application-level indicators are determined based on the context in which a system call is made. For example, when a file request is made, an authorization interceptor may determine the user that is making the request, a filepath for the request, and a type of action that is being performed (e.g., open file for read-write access). This information may be used to determine a corresponding service provider-level user name, resource name, and the like. Service-provider resource identifiers may include information identifying a specific web service, account identifier, etc. Resource identifiers for OS-level resources may be decorated with information indicating the type of resource (e.g., OS-level user or resource) and may include information that can be resolved to a specific workload that a customer is running. In this way, and others, a naming convention may be established to uniquely identify OS-level resources, users, actions, etc., in the context of a service provider that may manage many such workloads for a single customer or for multiple customers. In a multi-tenant compute service, an authorization interceptor detects the tenant who is making the request and then applies the security policy for that specific tenant even if the various tenants correspond to independent customers are running.

In at least one embodiment, process 500 comprises a step to determine 506 one or more applicable security policies managed by a policy management service. A policy management service external to the operating system may manage a policy database that defines the security policies applicable to various resources, including OS-level resources. These OS-level resources may have resource names that are decorated or otherwise specify what type of resource they are. In various embodiments, a policy management service manages the security policies applicable to the operating system and the operating system's kernel stores a local and protected cache of the security policies that are externally managed. These security policies may be used to determine one or more applicable security policies to the resource for which access is being requested. In some embodiments, security definitions are obtained by the system performing process 500 from policy management service and cached locally (memory and/or storage) to minimize traffic with the policy management service. This may be used in systems where the OS-level security policies do not frequently change. In some embodiments, a local cache of the OS-level security policies is maintained and updated (e.g. rebuilt) periodically, or in response to notifications from policy management service when updates have been made to the OS-level security policies.

In some embodiments, an authorization interceptor running in kernel space of an operating system sends a web service API request to a policy management service requesting evaluation of the request context to determine whether the access should be granted. In various embodiments, a policy management service receives a request context and performs a policy evaluation by retrieving applicable security policies from a policy database.

In various embodiments, process 500 comprises a step to perform 508 a policy evaluation using the request context, and the one or more applicable security policies that were determined. If no security policies are found, then a deny-by-default stance may be taken, whereby access to resources is denied by default, unless there is an explicit grant of permission. However, if applicable security policies are found, they may be used to determine whether access to OS-level resources should be granted. For example, security policies may specify one or more actions that can be performed, such as reading, writing, and executing files. Policy management service may perform an evaluation of any applicable security policies against the request context and then provide an evaluation result indicating whether access should be denied or granted.

Accordingly, a system performing process 500 may use security policies managed by a policy management service to determine whether to grant access to the computing resource of the operating system. In some embodiments, an authorization service of the operating system obtains applicable security policies from the policy management service and performs the policy evaluation locally within the kernel.

In at least one embodiment, process 500 comprises a step to determine whether 510 is to grant or deny access to an OS-level resource based on an evaluation determined using security policies managed externally from the operating system. The indication may be used to fulfill the request 512 using resources accessible to the kernel if the policy evaluation is in the affirmative or to deny 514 the request if the policy evaluation is in the negative.

Figure 6:
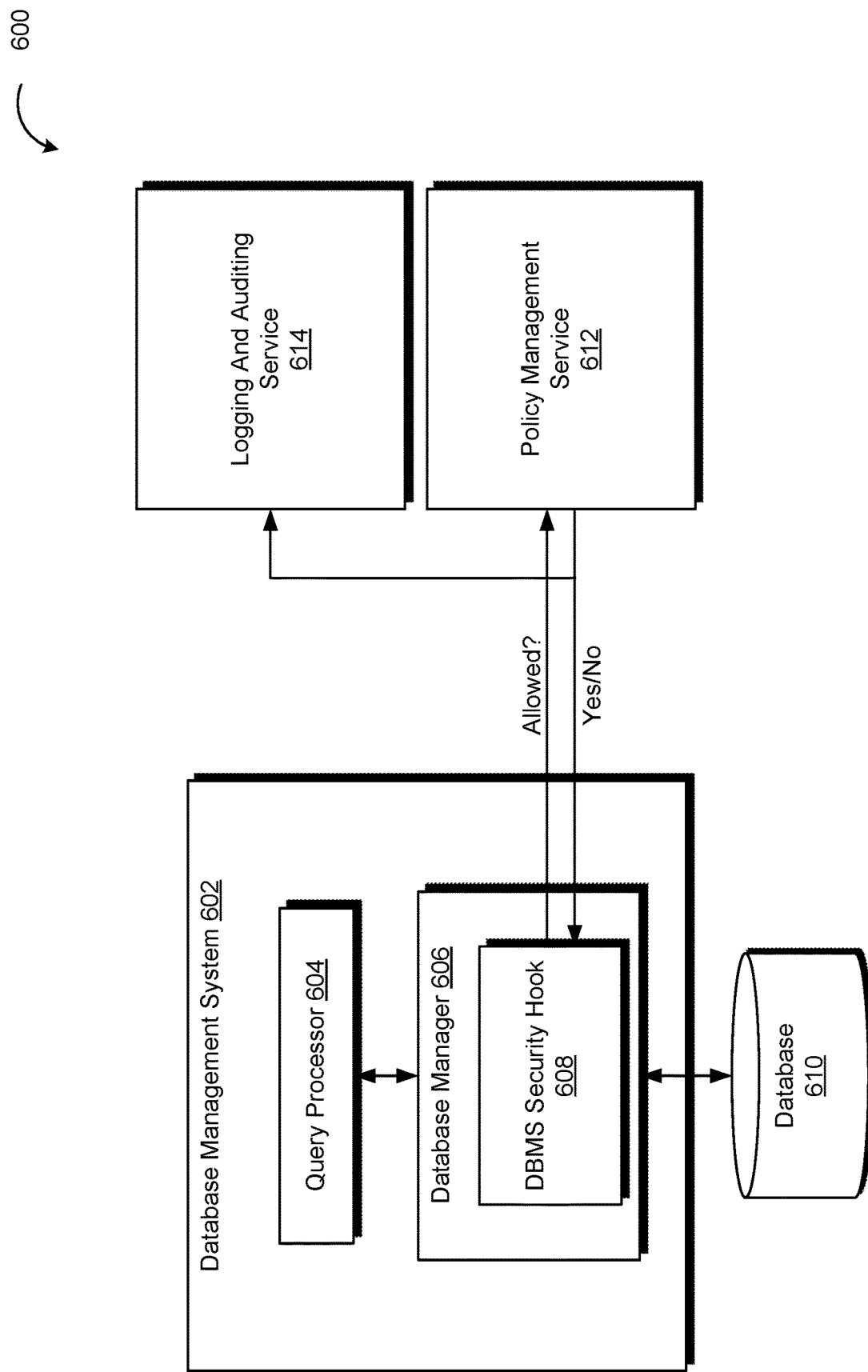
FIG. 6 illustrates a computing environment in which service-based security enforcement of a database management system is implemented, in accordance with one or more example embodiments of the present disclosure.

FIG. 6 illustrates a computing environment 600 in which service-based security enforcement of a database management system is implemented, in accordance with one or more example embodiments of the present disclosure.

In various embodiments, database management system 602 is implemented as a database service that is offered by a computing resource service provider to customers. A customer may interact with database management system 602 via web service API calls that are routed through a service frontend. In various embodiments, a database system comprises components such as a database management system 602. A database management system (DBMS) may refer to software that interacts with the underlying database itself. For example, database management system 602 may comprise a query processor 604 for receiving requests from users to interact with the underlying database in certain well-defined ways. Database management system 602 is implemented as a relational database management system (RDBMS) such as PostgreSQL, according to various embodiments contemplated in the scope of this disclosure. In a multi-tenant RDBMS service, the authorization interceptor determines the tenant who is making the database request and then is able to either apply the security policy for the specific tenant (e.g., when policy evaluation is performed in the RDBMS) or the request context sent to a policy management service encodes the tenant information, even if the various tenants correspond to independent customers.

A database management system may comprise a query processor 604. Query processor 604 may be a component of a database management system that is used to interpret requests (e.g., queries) received from end user via an application program into instructions. It also executes the user request that is received from a data manipulation language (DML) compiler. SQL is an example of a data manipulation language that is designed for managing data in relation to database management systems. Query processor 604 is used to convert requests from an application into function calls that can be executed by the database system, according to at least one embodiment. In various embodiments, query processor 604 uses a data dictionary to determine the architecture of the database and make use of this information to determine how to convert the query into instructions and craft a strategy for processing the query.

Database manager 606 may be referred to as a run-time database manager, and may be used to process application requests. Queries may be received by database manager 606 and processed using various sub-components, such as an authorization control, command processor, transaction manager, buffer manager, and so forth. Database manager 606 may use DBMS security hooks 608 to authorize queries. If a query is allowed, based on the query context, then the underlying database 610 storing data records may be accessed to process the user's query.

In various embodiments, database manager 606 comprises an authorization control module. The authorization control module may be used by the DBMS to determine the authorization of users and determine whether and/or how to process query requests. For example, an administrator or suitably privileged user may use a "GRANT" statement to allow access to various database resources, such as records and tables. For example, the following SQL statement may be used to grant ExUser the ability to select data from the ExTable:

GRANT SELECT ON ExTable TO ExUser

Database grants are used to provide users of a database with various privileges on tables and views, according to various embodiments. Conversely, database revokes may be used to revoke various permission grants that may have been previously issued. Database systems may implement a deny-by-default stance whereby access to database resources is denied by default, unless there is an explicit grant of permission.

When a query is received by database management system 602, the query statement may be parsed by query processor 604. As part of query processing, a set of database resources may be identified as being needed to fulfill the request and a type of access that is requested. Resources which can have permissions attached to them may be referred to as securables or securable resources.

In various embodiments, a database is a securable resource that includes some or more of the following actions that can be granted: BACKUP DATABASE, BACKUP LOG, CREATE DATABASE, CREATE DEFAULT, CREATE FUNCTION, CREATE PROCEDURE, CREATE RULE, CREATE TABLE, and CREATE VIEW.

In various embodiments, a scalar function is a securable resource that includes some or more of the following actions that can be granted: EXECUTE and REFERENCES.

In various embodiments, a table-value function is a securable resource that includes some or more of the following actions that can be granted: DELETE, INSERT, REFERENCES, SELECT, and UPDATE.

In various embodiments, a stored procedure is a securable resource that includes some or more of the following actions that can be granted: EXECUTE.

In various embodiments, a table is a securable resource that includes some or more of the following actions that can be granted: DELETE, INSERT, REFERENCES, SELECT, and UPDATE.

In various embodiments, a view is a securable resource that includes some or more of the following actions that can be granted: DELETE, INSERT, REFERENCES, SELECT, and UPDATE.

Policy management service 612 may be a service of a service provider that is external to database management system 602. Policy management service 612 may manage and facilitate access to security policies for database management systems in a policy database. In various embodiments, DBMS security hook 608 refers to a software library, module, plug-in, or other executable code that may be used to route authorization processes of database management service 602 to policy management service 612.

In various embodiments, a database query context is determined by DBMS security hook 608 and transmitted to policy management service 612 for evaluation against one or more applicable security policies. Policy management service 612 may determine a set of applicable security policies from a policy database and evaluate any applicable security policies against the database query context to determine whether the query is authorized. For example, if a user attempts to run a stored procedure (sproc) but does not have the EXECUTE permission (or a permission such as ALL that includes the EXECUTE permission), then authorization to run the sproc should be denied.

It should be noted that in various embodiments, policy management service 612 is used in place of a database management system's own authorization or security subsystems. There are various benefits to using an external policy management service 612 to perform authorization checks on behalf of resource managed by the database management system 602, including the ability to use provably security tools. In various embodiments, users of database management system 602—even including administrators—are not sufficiently privileged to perform operations that change the behavior of DBMS security hook 608. For example, in customized database management system 602 pre-loaded with DBMS security hook 608, it would not be possible to remove DBMS security hook 608 or change the behavior of database manager 606 to perform authorization checks using the local operating system's security policies rather than by using policy management service 612. In various embodiments, database management system 602 is configured to prevent policy management service 612 from being bypassed to allow for provably security tools to be used to evaluate the conditions under which the underlying database resources can be used. These tools may be used to mathematically prove various assertions that pertain to resources—such as database-level resources. For example, an SMT-based solver is used, in at least one embodiment, to review security policies managed by policy management service 612 to mathematically prove that the security policy database are equivalent to a reference policy. This type of mathematically sound policy analysis may be used to prove, in a mathematical sense, that the security policies implemented in policy management service 612 are either equivalent to or less permissive than a reference policy, which can be used to comply with data security requirements, for example, as required for auditing, certification, or other needs. For example, a mainframe workload may be migrated to a computing resource service provider that uses various compute services (e.g., running applications on an operating system), database resources (e.g., executable routines/transactions, data records), and so forth to perform the mainframe workloads. By defining and managing various internal resource permissions using an external policy management service, a policy analyzer may mathematically prove that a mainframe workload that is exported or migrated to run on a computing resource service provides the same—or better—security assurances as the off-premises mainframe counterparts.

Logging and auditing service 614 may refer to a service of a computing resource service provider that performs logging and auditing services. While not depicted in FIG. 6, other embodiments may be implemented with logging and auditing performed by separate services, or implemented with one but not the other. In various embodiments, each permissions request that is sent by DBMS security hook 608 and each response to such request may be recorded or otherwise logged by logging and auditing service 614. Logging and auditing service 614 may be a single point in which permission requests across multiple computing resources and/or types of computing resources within a computing resource service provider are collected and aggregated. For example, a mainframe workload may involve file access requests on an operating system (e.g., running on a compute instance of a computing resource service provider) and database query requests to access records stored in a database (e.g., database service offered by computing resource service provider), and so forth. Each of these requests may be recorded and aggregated together by logging and auditing service 614. A technical benefit of aggregating activity logs across all resources used in a workload (e.g., mainframe workload) is that comprehensive auditing may be performed—for example, tracing data lineages and following the flow of data from one subsystem to another subsystem. This may be used to ensure the confidentiality and/or security of data is preserved throughout an entire workload, for performing forensic analysis of where data is available or has been made available, and so forth.

Logging and auditing service 614 can be used to establish a set of baseline policies and enforce principles of least privilege. In at least one embodiment, a security policy creator can be defined to facilitate creation definition: on a reference machine with no initial security, the workloads to be authorized to run for a period of time long enough to see all features triggered. The corresponding security authorization logs that are collected are then analyzed to produce a sanitized version of the minimum set of security policies that are needed to ensure such access to all principals active in this workload on the basis of the principle of least privilege In various embodiments, a policy evaluation is performed wherein a database query context is compared against a set of applicable security policies to determine whether the query should be permitted. In various embodiments, such as those in accordance with FIG. 6, policy management service 612 determines whether the query should be allowed and sends an indication of yes/no to indicate the result of the policy evaluation. In other embodiments (not depicted in FIG. 6), DBMS security hook 608 or another suitable component of database manager 606 performs the policy evaluation by obtaining, from the policy management service 612, a set of applicable security policies and performs the policy evaluation against the query entirely within database management system 602. If the policy evaluation results in an affirmative evaluation, then the query may be fulfilled and executed according to any determined query strategies that may be used to optimize access to data of database 610. Otherwise, an indication that access is denied may be provided in response to the query.

Figure 7:
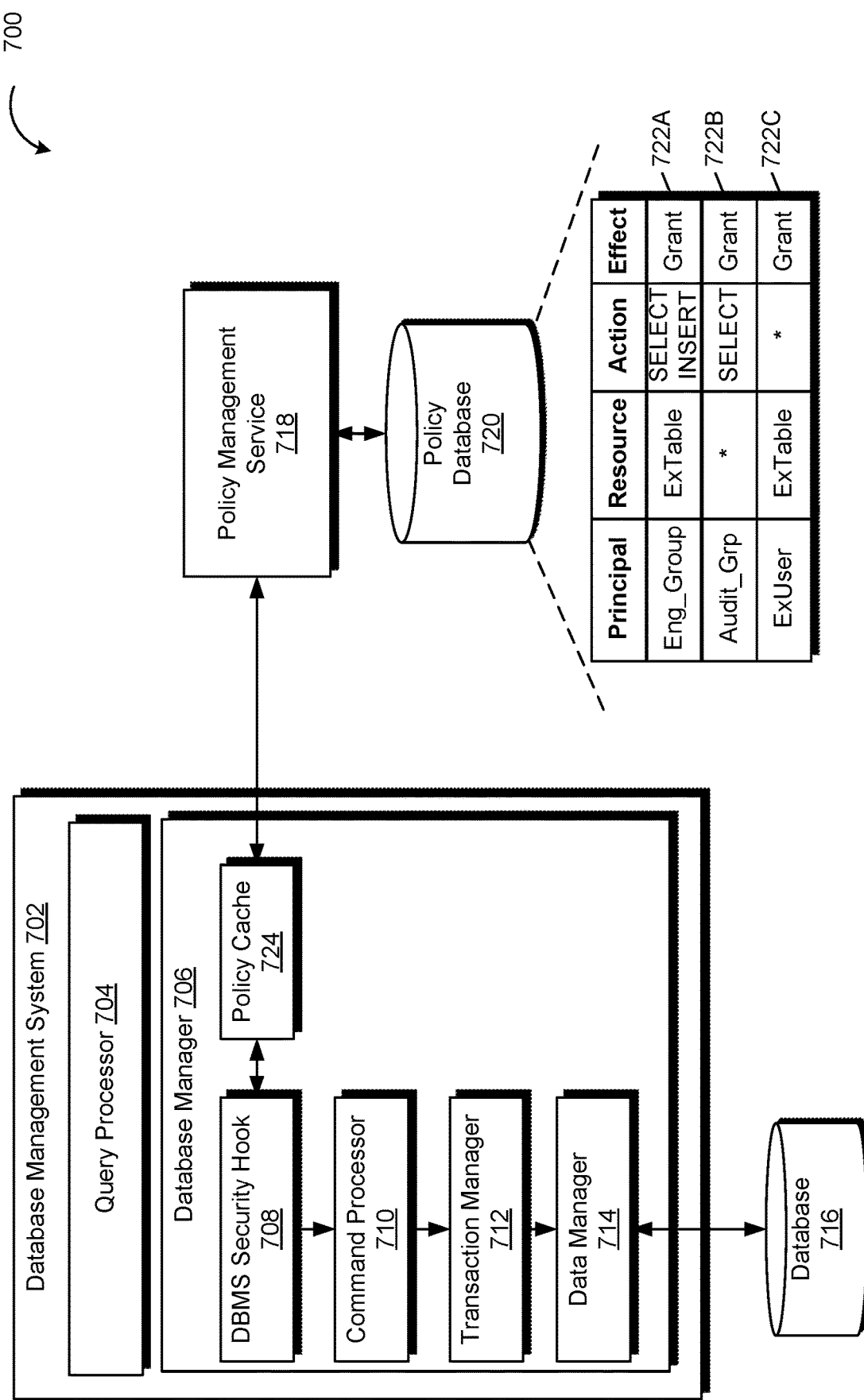
FIG. 7 illustrates a computing environment in which security policies for a database system are externally managed by a policy management service, in accordance with one or more example embodiments of the present disclosure.

FIG. 7 illustrates a computing environment 700 in which security policies for a database system are externally managed by a policy management service, in accordance with one or more example embodiments of the present disclosure.

In at least one embodiment, database management system 702 is implemented as a database service offered by a computing resource service provider. A computing resource service provider may provide various cloud-based services, such as cloud-based database services, compute services, workload services, and so forth. Identity and access management services may also be provided by a policy management service. Database management system 702 comprises a query processor 704 and a database manager 706, according to at least one embodiment. A database manager 706 may further comprise DBMS security hook 708, command processor 710, transaction manager 712, data manager 714, combinations thereof, and so forth. Query requests submitted by a client of DBMS 702 may be parsed by a query processor 704 and then sent to database manager 706 to determine how the request should be fulfilled. Database 716 may refer to the underlying database that is used to store structured data of the database system.

In various embodiments, database manager comprises a DBMS security hook 708 component that is used to authorize access to various database resources. These resources may be referred to as securables or securable resources.

In various embodiments, a database client submits a query request (e.g., a SQL query statement) that is parsed by query processor 704 to identify one or more database resources that are to be accessed as part of fulfilling the query. DBMS security hook 708 may be used to determine a database query context from the user query. In at least one embodiment, query statements are parsed to identify resources and actions for which a grant of access may be required to fulfill the query. Additionally, a database user that made the database query request may be identified.

DBMS security hook 708 may determine a database query context and use a policy cache 724 to perform policy evaluation. In various embodiments, the database-related security policies of policy management service 718 are replicated in policy cache 724 to provide a local view of the security policies. This local caching may be done for performance reasons. Policy cache 724 may be used to perform a policy evaluation and determine whether the requested database operation should be fulfilled. Policy cache 724 may comprise security policies of policy database 720 that pertain to the specific database instance. Policy database 720 may be in accordance with those described elsewhere in this disclosure, including those described in connection with FIGS. 2-4. Policy database 720 may comprise records that correspond to security policies that pertain the computing resources directly managed by a computing resource service provider, as well as those that are managed by resources within the service provider. For example, security policies database records of a database service hosted by a computing resource service provider may be stored in policy database 720 and used to perform policy evaluations on behalf of the database system.

Policy management service 718 may manage security policies on behalf of database management system 702 to control access to internal resources of the database management service 702. For example, security policies 722A-C may pertain to internal resources of database management system 702. A first security policy 722A may correspond to a grant statement that allows an engineering group "Eng_Group" (e.g., users thereof) to perform SELECT and INSERT commands on an "ExTable" table of the database. A second security policy 722B may be generated and stored in policy database 720 as a corresponding grant that allows a group of users "Audit_Grp" to perform SELECT operation on various database resources (e.g., table-valued functions, tables, views, and any other securables that support SELECT functionality). Third security policy 722C may correspond to a specific user ExUser that is granted privileges to perform any command on a specific table ExTable.

Although not depicted in FIG. 7, security policies for database resources may be decorated to include additional information that identifies the principal, resource, action, etc. as being specific to a database resource or even to a specific database instance that is being hosted by a computing resource service provider. In some embodiments, the principal and/or resource name may be decorated with information indicating that the principal and/or resource is an internal database resource. In some embodiments, the principal and/or resource name includes an identifier that uniquely identifies a specific database instance, thereby allowing a security policy to identify a particular user of a particular database instance, a particular resource of a particular database instance, and so forth. Actions may be specified as database action types, which may include actions that can be granted on a database, including but not limited to: ACKUP DATABASE, BACKUP LOG, CREATE DATABASE, CREATE DEFAULT, CREATE FUNCTION, CREATE PROCEDURE, CREATE RULE, CREATE TABLE, CREATE VIEW, EXECUTE, DELETE, INSERT, REFERENCES, SELECT, and UPDATE. In some cases, the resource type may dictate the types of operations that can be performed. For example, the EXECUTE command is not applicable to a table, but would be applicable to a stored procedure, according to at least one embodiment.

In various embodiments, each GRANT statement of a database system is stored in policy database 720 as a corresponding security policy record. Policy management service 718 may be used to perform policy evaluation tasks for a database query request by determining a set of applicable security policies and then evaluating whether the database resources needed to fulfill the request have corresponding grants. If access to all resources needed to fulfill the grant are granted, then the request may be fulfilled and the query may be fulfilled using command processor 710, transaction manager 712, data manager 714, access database 716, or some combination thereof.

Figure 8:
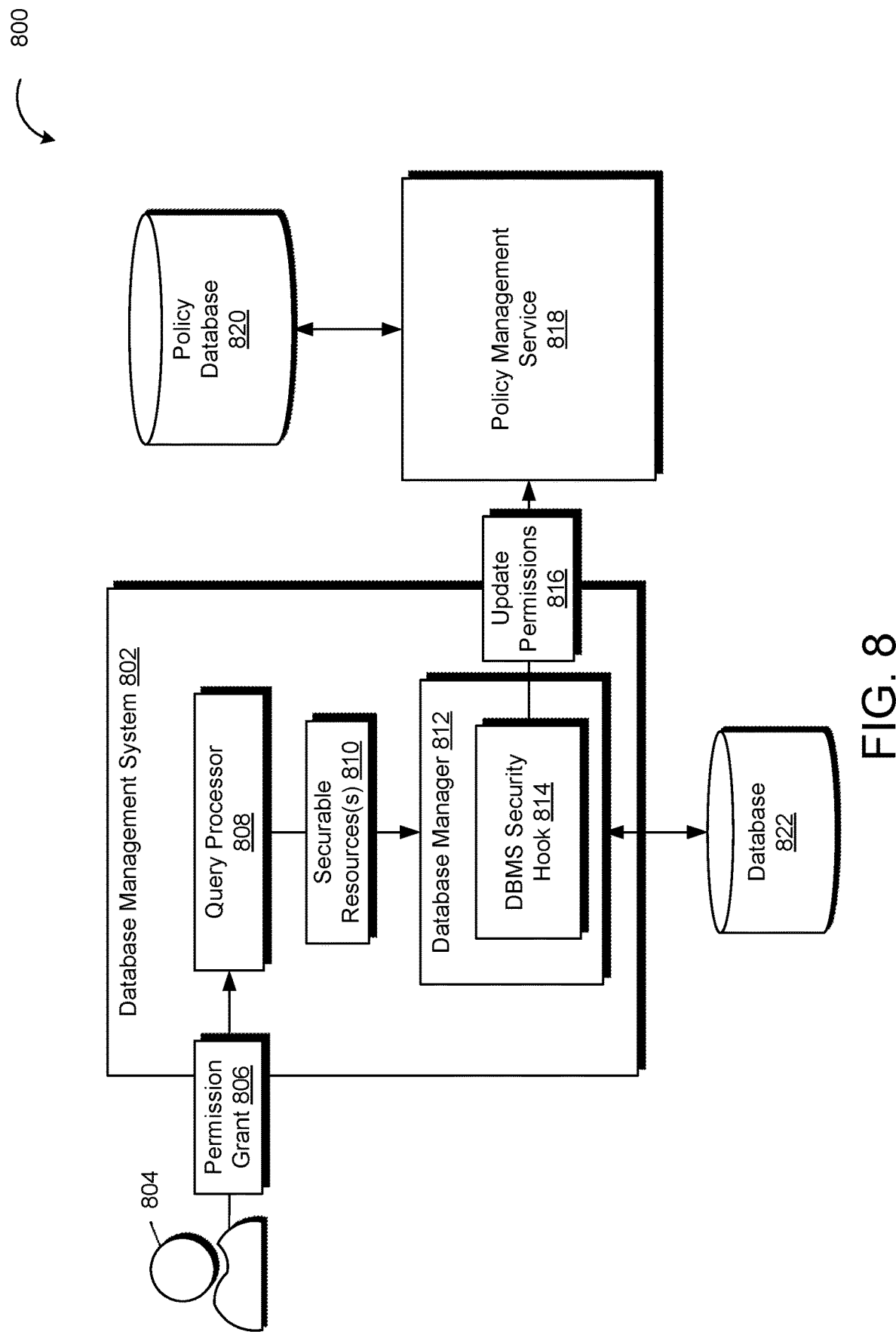
FIG. 8 illustrates a computing environment in which a permission grant for a database system is forwarded to an externally managed by a policy management service using a database management system (DBMS) security hook, in accordance with one or more example embodiments of the present disclosure.

FIG. 8 illustrates a computing environment 800 in which a permission grant for a database system is forwarded to an externally managed policy management service using a database management system (DBMS) security hook, in accordance with one or more example embodiments of the present disclosure.

In various embodiments, database management system 802 provides an application interface to users such as user 804 to interact with a database. User 804 may be able to submit database queries according to a data manipulation language, such as SQL. In various embodiments, user 804 is able to manage permissions for the database system by performing GRANT and REVOKE commands. A grant may refer to a request to extend the privileges of a user, whereas a revoke may be used to remove permissions that a user has. A permission grant 806 as depicted in FIG. 8 may be processed by database management system 802 such that an external policy management service is used to manage the security policies used to control access to various internal resources of the database system.

Permission grant 806 may be a database statement according to a data manipulation language such as SQL that is intended to modify user permissions. For example, a grant statement may be in the following syntax:

GRANT [permission] ON [securable resource] TO [principal]

Permissions may correspond to various actions that may be performed. Each type of resource may have a predefined list of permissions that are applicable to the resource type. For example, a database table may allow for delete, insert, references, select, and update actions, but does not execute actions on the database table. Likewise, a scalar function may allow for execute and references, but not select, insert, delete, and update.

Permissions grant 806 may be received by database management system 802 via a service frontend and the request may be sent to a query processor 808. In various embodiments, query processor 808 is used to extract securable resources 810 specified in permission grant 806. In some cases, the securable resources 810 are determined using another component of database management system 802 and provided to database manager 812. In various embodiments, database manager 812 comprises DBMS security hook 814 that overrides the database management system's default behavior when handling grant and revoke commands. Typically, a database management system manages its own grants and revokes them internally. In accordance with FIG. 8 and in at least one embodiment, DBMS security hook 814 overrides the default database management system behavior as it relates to grants and revokes and submits a web service API command to policy management service to update permissions 816. In various embodiments, the command determine determines the database context of the permission grant and maps the database user, database permission, and database securable to correspond with web service user, web service action, and web service resource. In various embodiments, the corresponding web service identifiers are decorated with additional information that uniquely identifies specific database management system which the security policy pertains.

Policy management service 818 may receive an update permission 816 request from database management system 802 and update policy database 820 to reflect the requested permission grant. For example, policy database 820 may be updated with a new record that corresponds to a security policy that can be used to grant access to securable resources 810 of database 822.

Figure 9:
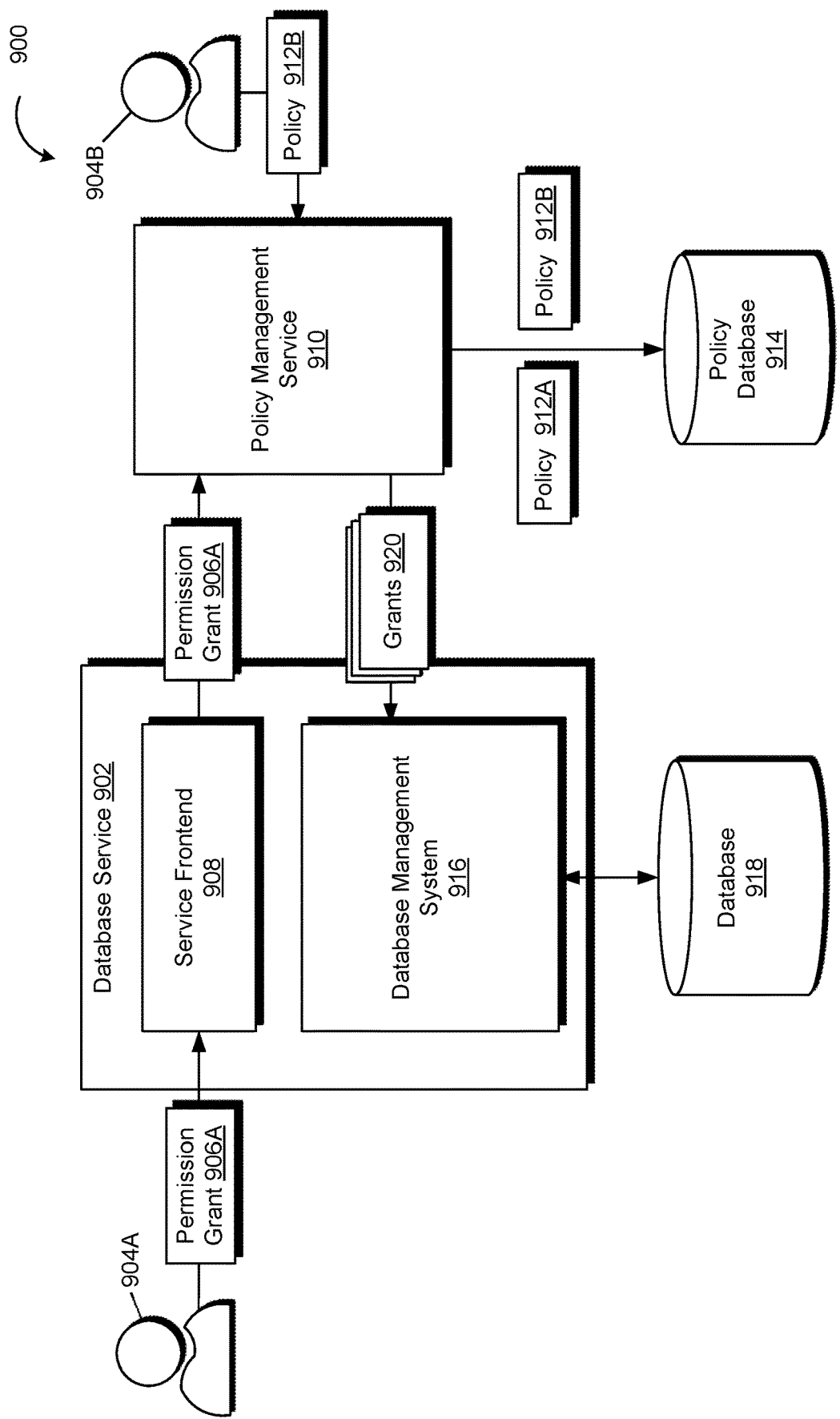
FIG. 9 illustrates a computing environment in which a permission grant for a database system is forwarded to an externally managed by a policy management service using a database management system (DBMS) security hook, in accordance with one or more example embodiments of the present disclosure.

FIG. 9 illustrates a computing environment 900 in which a permission grant for a database system is forwarded to an externally managed policy management service using a database management system (DBMS) security hook, in accordance with one or more example embodiments of the present disclosure.

In some cases, it is possible to modify a database management system to incorporate additional functionality, such as DBMS security hooks, as described in connection with FIG. 8. This may be possible when the source code for such database systems is available, for example, when open source database such as PostgreSQL is used as the underlying database system. In contrast, embodiments discussed in connection with FIG. 9 may involve the use of databases in which such modifications are not possible—for example, where the source code for the database system is propriety or not otherwise easy to modify to incorporate a DBMS security hook. FIG. 9 illustrates various embodiments in which a database service 902 nonetheless is able to use an external policy management service to implement various security features.

Database service 902 may refer to a service that is provided by a computing resource service provider. Database service 902 may host various types of database systems, such as open source databases (e.g., PostgreSQL) and proprietary databases. A customer of database service 902 may choose from several different types of database offerings and select the database system that is best suited for the customer's needs. For example, a customer that is migrating a mainframe workload from an on-premises database system that uses SQL server may choose to use an analogous SQL server offered by the computing resource service provider so as to reduce the complexity of such migrations.

In FIG. 9, a first user 904A of database service 902 is depicted as submitting an API request to grant a permission. A first permission grant 906A submitted by first user 904A via database service 902 may be used to modify the privileges of database users. A grant is typically used to expand a user's access privileges, whereas a revoke is typically used to reduce a user's access rights. While a first permission grant 906A is depicted in FIG. 9, techniques described herein may be similarly applicable to revocations and any other types of commands that modify users' database privileges.

A service frontend 908 of database service 902 may receive a permission grant from first user 904A. The permission grant may be encoded in a data manipulation language, for example, as a SQL statement. When service frontend 908 detects a request to modify permissions, that request may be forward to policy management service 910. Policy management service 910, in at least one embodiment, includes a software component that is used to map the database permission grant 906A to a first policy 912A that is stored in policy database 914. First policy 912A may comprise a principal, an action, a resource, and an effect.

In various embodiments, a second user 904B may directly interact with policy management service 910 to modify the permissions on database management system 916. For example, second user 904B can submit a second policy 912B to grant or revoke access to database resources managed by database management system 916, such as database tables and views. Policy management service 910 may receive second policy 912B and store second policy 914 in policy database 914

Policy management service 910 may, in addition to writing policies such as first policy 912A and second policy 912B to policy database 914, may also control the security of database management system 916. In various embodiments, users are not able to circumvent policy management service 910 when causing changes to the permission of database management system 916. Policy management service 910, in various embodiments, determines grants 920 that reflect the database-related policies that are in policy database 914. For example, if first policy 912A indicates that User_A should have read access to Table_X and second policy 912B indicates that User_B should have full access to Table_Y, then grants 920 may comprise SQL statements to provide such grants:

GRANT SELECT ON Table_X TO User_A
GRANT * ON Table_Y TO User_B

In such embodiments, the database management system 916 receives permission grants 920 exclusively from policy management service 910, and policy management service 910 is able to ensure that the permission grants in database management system 916 reflect the security policies that it has stored in policy database 914. In this way, mathematically sound policy analysis can be performed using the database-related policies stored in policy database 914, as they accurately reflect the permission grants of database management system 916.

In various embodiments, policy management service supports custom and fine-grained security policies for database systems. For example, instead of granting full system administration privileges to a user, the policy management service can define authorization to a given user for a specific utility (for example, authorization to reorg a table in place for better access but not to backup it on disk). In this way, a first set of administration privileges may be granted to a user while a second set of administration privileges are not. In some embodiments, a security policy grants a user access to a first portion of a database table but not to a second portion (e.g., certain entries can be marked as sensitive and not accessible without elevated privileges).

Figure 10:
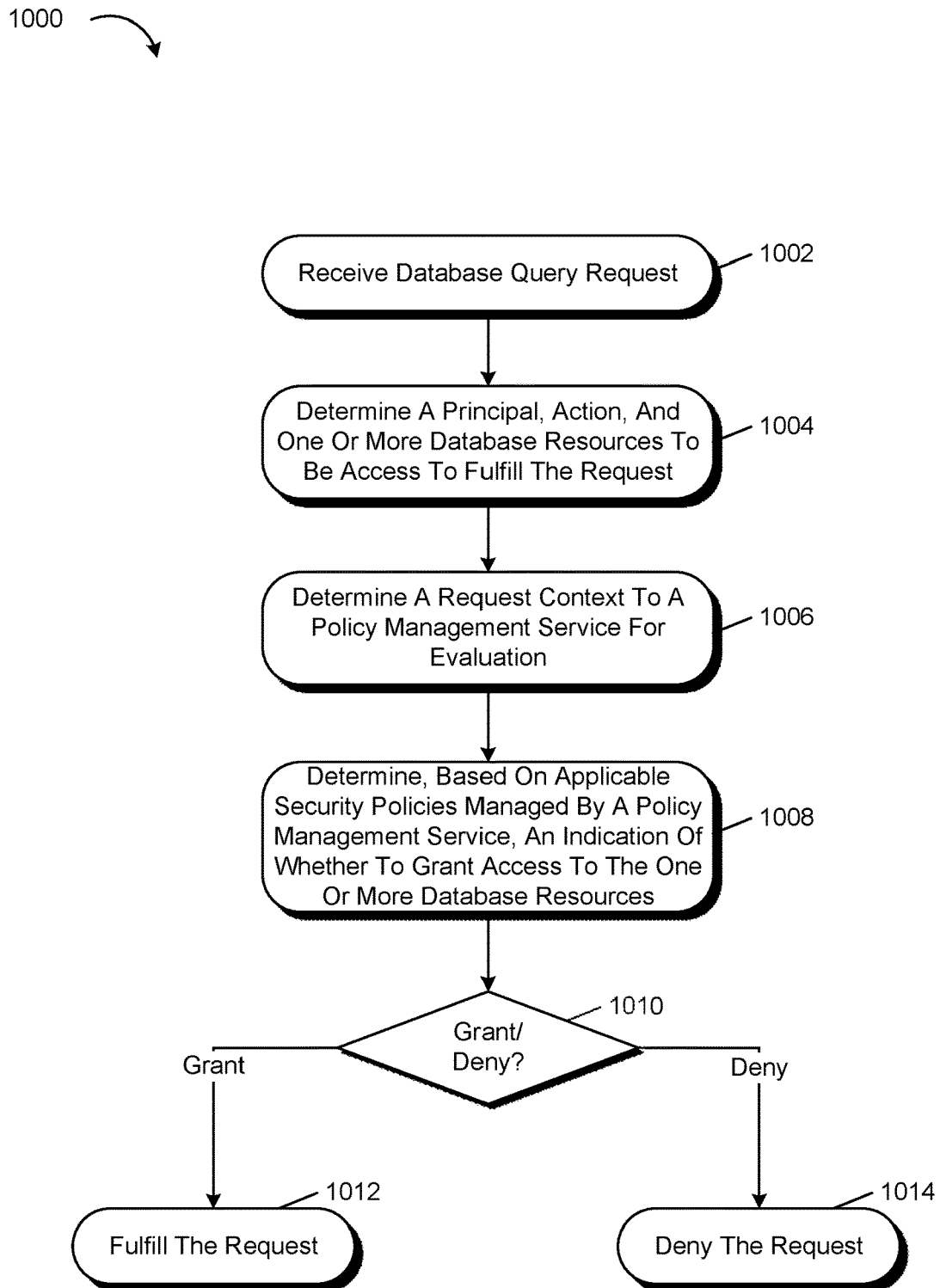
FIG. 10 shows an illustrative example of a process for performing authorization checks of a database system using an external policy management system, in accordance with one or more example embodiments of the present disclosure.

FIG. 10 shows an illustrative example of a process 1000 for performing authorization checks of a database system using an external policy management system, in accordance with one or more example embodiments of the present disclosure. In at least one embodiment, some or all of the process 1000 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 1000 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 1000 may be implemented in the context of various systems and methods described elsewhere in this disclosure, such as those discussed in connection with FIGS. 6-9 and 17. In at least one embodiment, process 1000 or a portion thereof is implemented by a computing resource service provider.

In at least one embodiment, process 1000 comprises a step to receive 1002 a database query request. The request may be formatted as a data manipulation language (DML) statement or a data definition language (DDL) statement, such as a SQL query statement. DDL statements may be used to define data structures, and may be used to manage the database system by creating, altering, or dropping data structures in a database. DML statements may affect information stored in the database, and may be used to insert, update, and update records in the database. In various embodiments, the statement is generated by a client application and transmitted to a database service for fulfillment. The query request may be received by a database management system that uses a query processor to determine a set of database resources that will or may be needed to fulfill the request. The query processor output may be provided to a database manager that is used to perform database runtime operations. The database manager may comprise an authorization component, which may be implemented as a DBMS security hook that uses a policy management service external to the database system to determine whether various database queries should be fulfilled.

In at least one embodiment, process 1000 comprises a step to determine 1004 a principal, action, and one or more database resources to be accessed to fulfill the request. The query may be parsed to extract a database query context, which is used for policy evaluation in various embodiments. For example, a database user making a query may be mapped to a service provider user identifier, a database table may be decorated to uniquely identify the specific table in the database from other database tables used in other contexts, and so forth.

In at least one embodiment, process 1000 comprises a step to determine 1006 a request context. In various embodiments, a DBMS security hook maps the database query to a security policy format within the context of a computing resource service provider, with a policy management service of the service provider. In various embodiments, security policies managed by the policy management service are replicated in a local cache of the DBMS.

In at least one embodiment, process 1000 comprises a step to determine 1008, based on applicable security policies managed by a policy management service, an indication of whether to grant access to the one or more database resources. A request context from the DBMS security hook of a database system is used to determine a set of applicable security policies, and policy evaluation may be performed to determine whether access should be granted by evaluating the request context against the set of applicable security policies. For example, the request context may indicate one or more database resources (e.g., securables) are to be accessed as part of the database query. If the applicable security policies indicate that access to the database resources should be allowed in the requested manner, then the request may be authorized. However, if there is a security policy explicitly denying access to the database resources, or if no applicable security policy provides an explicit grant of access, then the database query request may be considered unauthorized. The DBMS security hook may provide a response indicating whether access should be granted or denied.

Once the indication has been determined, the system may use that indication to determine whether 1010 to grant or deny access to the resource based on the result of the policy evaluation. If the indication is in the affirmative, the DBMS may fulfill 1012 the request and use downstream components of a database manager to access the underlying data of the database that the requestor has been authorized to access. However, if the indication is to the contrary, then the DBMS may deny 1014 the request, indicating that the requestor has insufficient privileges to access the database in the requested manner.

Figure 11:
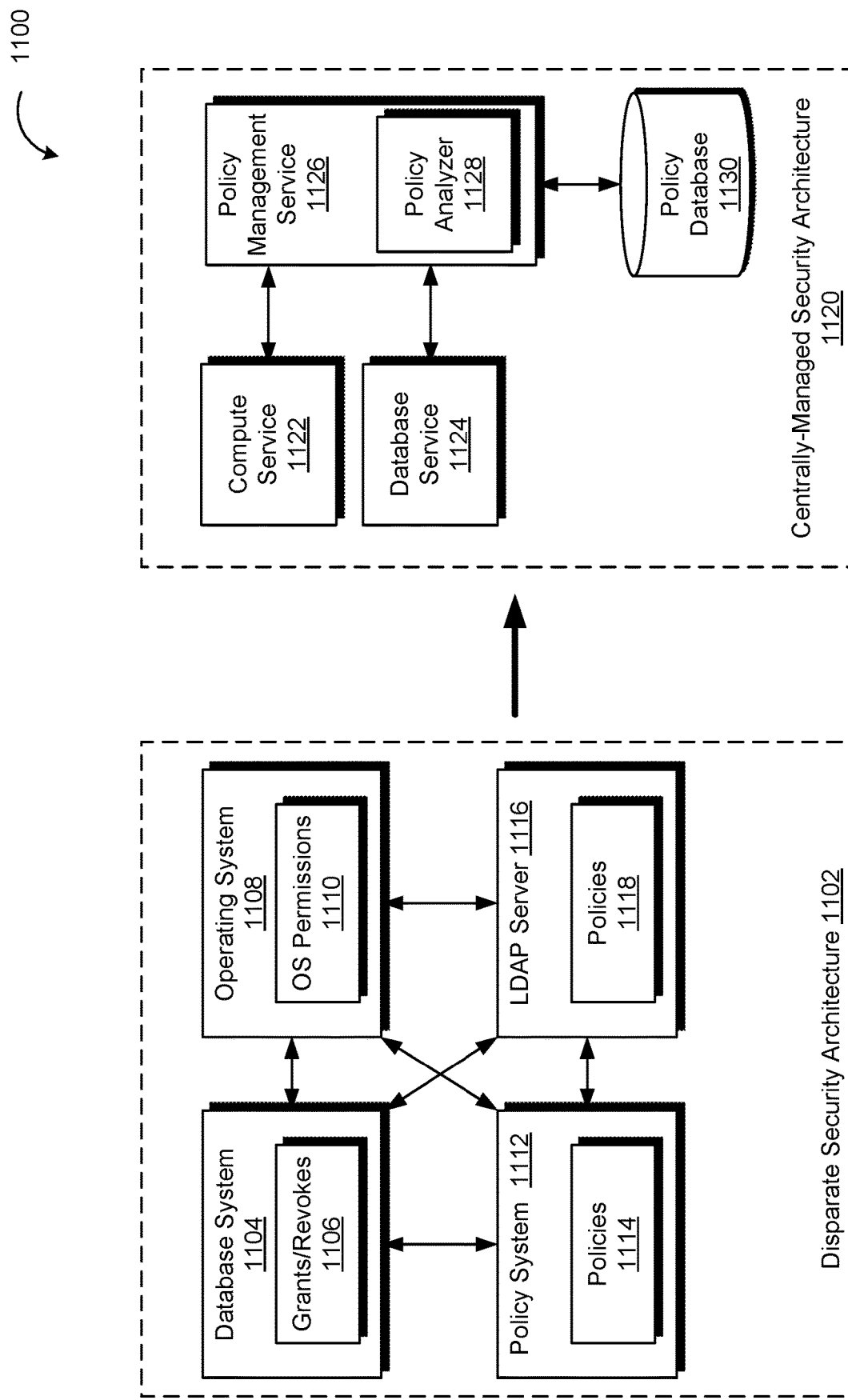
FIG. 11 illustrates a diagram that depicts architectural aspects of different security architectures.

FIG. 11 illustrates a diagram 1100 that depicts architectural aspects of different security architectures. On the left hand side of FIG. 11, a disparate security architecture 1102 is depicted. The disparate security architecture 1102 may be used to implement mainframe-migrated workloads in a service provider environment, but has various shortcomings. For example, mainframe security definitions (e.g., defined in a RACF database) are imported, the security definitions may be transposed into different systems. For example, an RACF database may specify how various database (e.g., DB2 database) resources can be used, and those security definitions may be imported into a database system 1104 as grant and revoke statements 1106 for database users. Security definitions that pertain to the ability to read, write, and execute files may be managed by operating system 1108 and setting various OS permissions 1110 on operating system users. Policy system 1112 may be used to manage the permissions to various computing resources that are utilized to run the mainframe workload, for example, access to data buckets and data objects that a service provider may provide as part of a data storage service. Policy system 1112 may define various policies 1114 at the service provider level that apply to service provider user accounts. Lightweight Directory Access Protocol (LDAP) server 1116 depicted may be used to store additional policies 1118 that do not easily match the semantics that can be expressed using database system 1104, operating system 1108, policy system 1112, and other systems that implement their own security models. For example, an LDAP server may be used to define policies 1118 at higher-level semantics and allow for a specific grant of authorization to revert some operation on a customer account, a grant of authorization to trade or pay for a certain maximum amount, and so forth.

This dispersion of disparate definitions "facilitates" the creation of security gaps by the system operators as they cannot evaluate and analyze the global security from one single place with a unified tooling. In that sense, it is a significant drawback when compared to core systems like mainframes where all of the security is managed in a fully centralized manner (e.g., using System Authorization Facility) relying upon a single and unified security database (RACF) encompassing all of the security definitions. This centralization allows to develop tools do thorough end-to-end security validation.

Finally, many logging and auditing tools cannot be applied across the disparate security architecture as the authorization requests and determinations may be made internal to some of the disparate systems, resulting in a lack of uniformity and auditability.

In contrast, centrally-managed security architecture 1120 depicted on the right hand side of FIG. 11 may serve as an architecture that is implemented by various embodiments described herein. All security definitions related to cloud services such as compute service 1122, database service 1124 are managed by policy management service 1126 and stored in policy database 1130. The policy database 1130 may store mainframe-related security permissions. Mainframe-related sources may be specified as a new type of service resource, and new kinds of actions/authorization may be available on these resources. For example, supported actions for database tables may include DELETE, INSERT, REFERENCES, SELECT, and UPDATE. Those permissions reside outside of the mainframe cloud service, and in a central policy database 1130 with all other security definitions related to other cloud services used by the applications. In various embodiments, those security definitions use standard regular expressions as needed on resources to minimize and simplify the definition work. Policy management service 1126 may comprise or otherwise have access to a policy analyzer 1128, which may be used to provably demonstrate that the security policies for a mainframe workload meet certain security assurances.

Security enforcement is achieved through reprogramming and modification of database systems and operating system components. In various embodiments, an operating system that is provisioned and launched by compute service 1122 is configured with a kernel-mode authorization interceptor that uses policy database 1130 to perform policy evaluation and determine whether various system calls to access OS-level resources should be permitted. Likewise, a database management system may include hooks to reprogram and extend its original security features to use policy database 1130 for security enforcement. In various embodiments, these authorization components are wrapped in the managed service so that it is not possible to circumvent them through replacement or workarounds.

In various embodiments, mainframe-related security permissions are defined in a policy management service (e.g., via reuse of existing APIs). New kinds of resources may be defined to specify mainframe resources and new kinds of authorizations may be defined on those resources. Thus, those security policies and permissions will reside outside of a mainframe cloud service in a central policy database with all other security definitions related to other cloud services used by the application. Those definitions may use regular expressions to minimize and simplify the definition work. For example, "Read File X.Y.*" may allows a user to have a read access to any data set whose name starts with X.Y.

Mainframe definitions may be imported in bulk to policy database using an automated procedure comprising of a mainframe database (e.g., RACF database) export, download, parse/reformat, and import process. Security enforcement for the mainframe-migrated cloud service may be achieved via mainframe service security hooks to reprogram and extend the original security features. For example, all security codes for calls may be wrapped in the managed service. As such, it would not be possible to circumvent them through replacement or workaround of this custom code.

Figure 12:
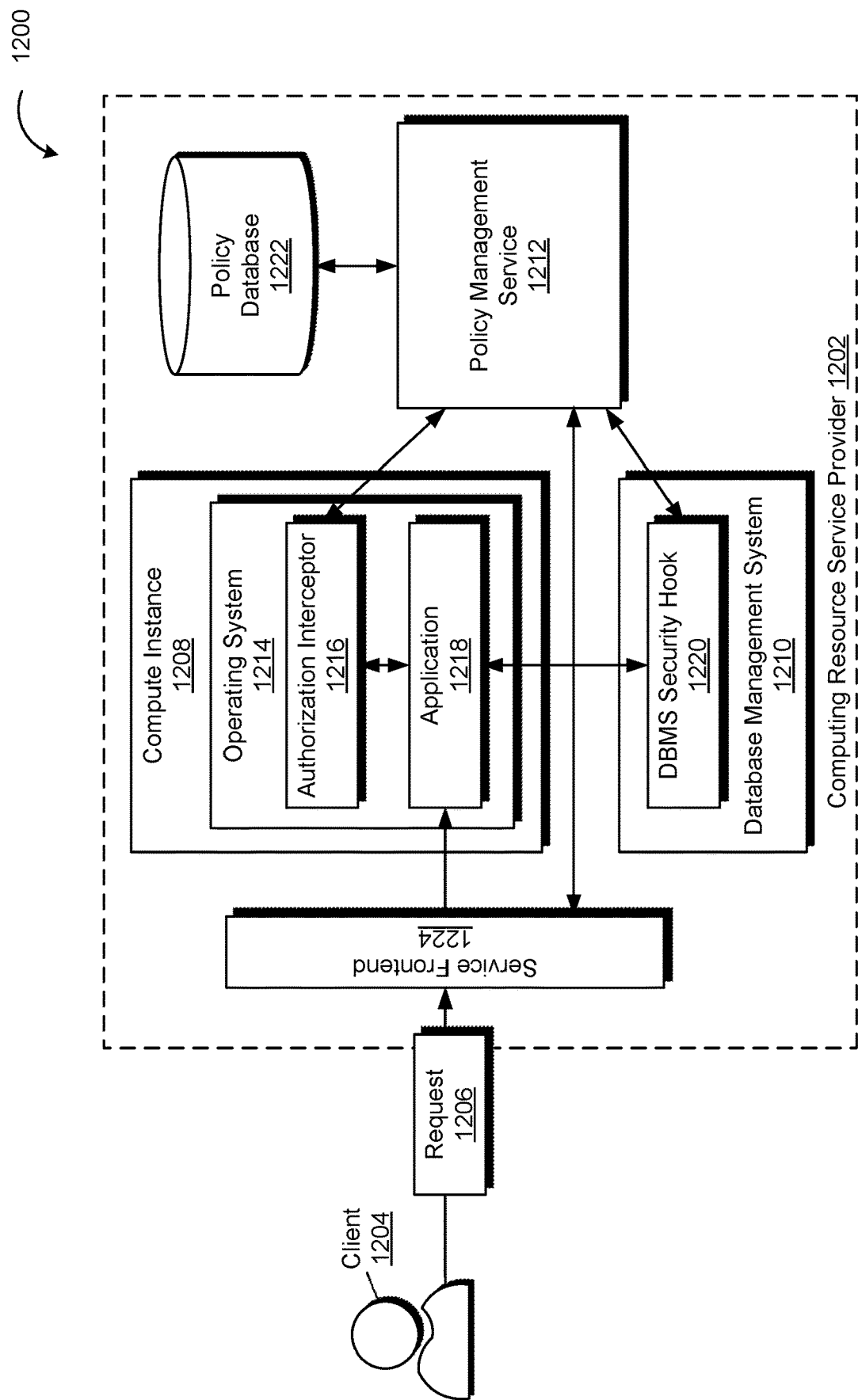
FIG. 12 illustrates a computing environment in which mainframe workloads are processed in a computing resource service provider, in accordance with one or more example embodiments of the present disclosure.

FIG. 12 illustrates a computing environment 1200 in which mainframe workloads are processed in a computing resource service provider, in accordance with one or more example embodiments of the present disclosure.

Computing resource service provider 1202 may refer to a cloud-based service that provides various services, such as compute services, database services, policy management services, and so forth. In various embodiments, computing resource service provider 1202 is used to provide mainframe services, for example, as depicted in FIG. 12. A mainframe workload may involve the usage of different types of resources, including, for example, an application that runs in an operating system environment, and a database to persist and access various data records of interest.

Client 1204 may refer to a client that submits requests such as request 1206 to perform various functions within the context of a mainframe service. Client 1204 may refer to a customer of a computing resource service provider 1202 or a computer system controlled by such an entity. In various embodiments, client 1204 communicates with computing resource service provider over a communications network to submit workload requests. Client 1204 may refer to an individual, organization, or computer systems operating under the control of such entities. In various embodiments, client 1204 migrates an on-premises mainframe environment into a computing resource service provider.

Request 1206 may refer to a mainframe request or requests for other applications. In various embodiments, a client 1204 submits a workload request to a frontend of a service provider and then the request is forwarded to a mainframe for processing. In various embodiments, computing resource service provider 1202 operates a compute instance 1208, database management system 1210, and policy management service 1212 to facilitate the execution of mainframe workloads. In various embodiments, client 1204 submits request 1206 to a computing resource service provider 1202. The request 1206 for access to application 1218 may be received by a service frontend 1224, which, in some examples, comprises a web server configured to receive such requests and to process them according to one or more policies managed by policy management service 1212. Policy database 1222 may store security policies that can be evaluated to determine whether the request 1206 made by client 1204 should be authorized.

Compute instance 1208 may refer to a virtual machine instance, container instance, serverless compute instance, etc., that is provisioned by a compute service of computing resource service provider 1202. Compute instance 1208, in at least one embodiment, uses policy management service 1212 to manage access to resources within the service provider or of the service provider. In an example embodiment, compute instance 1208 is a virtual machine instance running an operating system 1214 (e.g., Linux or Unix-based operating system). The operating system may be provisioned with an authorization interceptor 1216 that runs in the operating system's kernel space and intercepts system calls to determine whether access to resources managed by the operating system should be granted. Authorization interceptor 1216 may comprise a local policy cache of security policies that are managed by policy management service that specifies the rules for accessing various resources of the operating system. Application 1218 may refer to a mainframe application that may utilize various computing and storage resources. The application may refer to an application running on a Linux or Unix-based operating system and that is configured to interface or use a database management system 1210. For example, application 1218 may submit database requests to database management system 1210 to execute transactions, query data, and so forth.

Database management system 1210 may be provisioned and hosted by a database service of computing resource service provider 1202. Database management system 1210 may comprise various components not illustrated in FIG. 12, such as a query processor, run-time database manager, the underlying data store itself, and so forth. Database management system 1210 may refer to software that application 1218 interacts with to interact with a database according to a well-defined domain-specific language, such as SQL. Database management system (DBMS) may comprise a DBMS security hook 1220 that is used to interface with a policy management service 1212. DBMS security hook 1220, in some embodiments, obtains security policies applicable to database management system 1210 from policy management service 1212 and stores them locally in a policy cache. When database query requests are received (e.g., from application 1218), the requests are parsed to determine a database request content and compared against one or more applicable security policies to determine whether or not to fulfill the query based on whether the requestor has sufficient privileges to access the database resources in the requested manner.

A policy management service 1212 may provide access to, and administration of, policies applicable to requests for access to computing resources of a computing resource service provider as well as resources within a computing resource service provider. Operating system 1214 and database management system 1210 may delegate the management of security policies for their internal resources to policy management service 1212, which stores applicable OS-level and database-level security policies within policy database 1222.

To enforce interception of all system calls, customer administrator users would lose direct access to mainframe administrator privileges on the mainframe application (e.g., runtime) itself. But those administrators would be able to re-obtain such a global privilege by an equivalent policy management service security profile via proper authorizations on all system calls for their own identities, with the benefit (for compliance) that all their administrator commands would be then logged.

Figure 13:
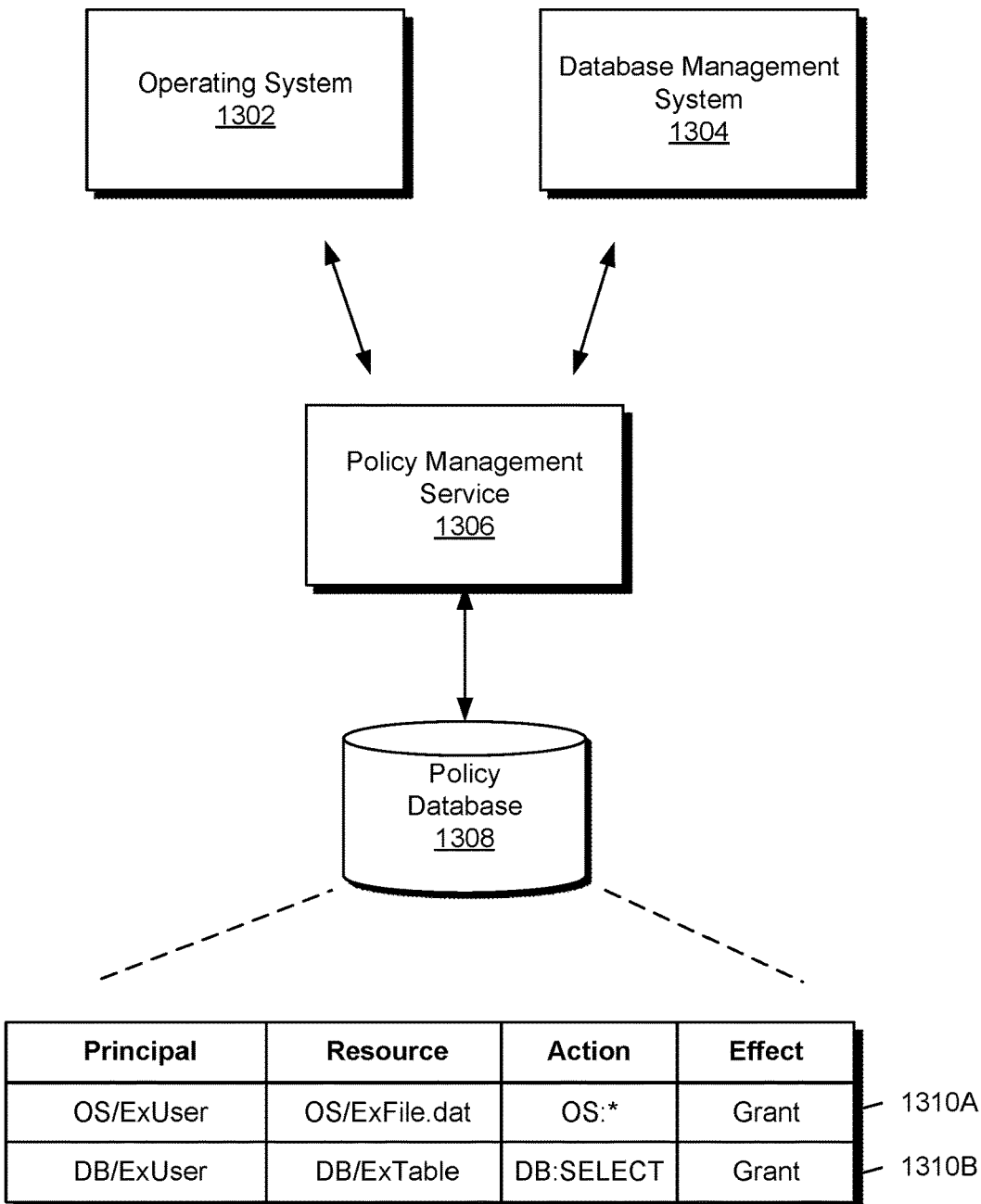
FIG. 13 illustrates a computing environment in which security policies for mainframe workloads are managed by a central service, in accordance with one or more example embodiments of the present disclosure.

FIG. 13 illustrates a computing environment 1300 in which security policies for mainframe workloads are managed by a central service, in accordance with one or more example embodiments of the present disclosure.

As depicted in FIG. 13, operating system and database management system utilize security policies stored in a policy database managed by policy management service, according to at least one embodiment. Operating system 1302 may refer to any suitable operating system, such as a Linux or Unix-based operating system. Operating system 1302 may be provisioned with a kernel-mode component that interfaces with policy management service 1306. Security policies that are used to control access to OS-managed resources may be stored in policy database 1308. For example, security policy 1310A depicted in FIG. 13 may refer to a security policy that is applicable to operating system 1302, as depicted by the "OS" prefix in the principal, resource, and action fields. In various embodiments, these values are decorated with additional information that identifies a specific OS instance or a specific OS configuration for use in a multi-resource environment such as an environment for processing mainframe workloads.

Database management system 1304 is provisioned with a security hook in various embodiments, wherein the security hook interfaces with policy management service 1306 and caches or otherwise accesses security policies managed by policy management service 1306. Security policies applicable to database management system, such as security policy 1310B may be locally and securely cached by database management system 1304 to perform policy evaluations and determine whether to authorize access to various database resources, such as the "ExTable" specified in security policy 1310B.

Policy database 1308 may be used to store various types of security policies, including those for OS-level resources, database-level resources, as well as resources managed by the computing resource service provider. Policy management system 1306 is used to implement various security features that may otherwise not be natively supported by operating system 1302 and/or database management system 1304. For example, a file of operating system 1302 may have several applicable security policies that define a first set of permissions for a first OS user and a second set of permissions for a second OS user. This type of multi-user and/or multi-group policy definitions may be used in lieu of Linux's permissions, which only allows permissions to be set for a single user and a single group. Policy management service 1306 may be used to provide fine-grained control over database management system 1304. Whereas traditional database systems may provide administration privileges in an all-or-nothing manner, policy management service can be used to define authorization to a given user for a specific utility (example, authorization to reorg a table in place for better access but not to backup it on disk).

Policy database 1308 can be used to provide additional functional level of security with business-related semantics—for example, a security policy may allow for a specific grant of authorization to revert some operation on a customer account, a grant of authorization to trade or pay for a certain maximal amount, and so forth. These types of semantics are not typically definable in the context of database-level grants and revokes. Such customized authorizations cannot be expressed through standard mainframe security products.

Figure 14:
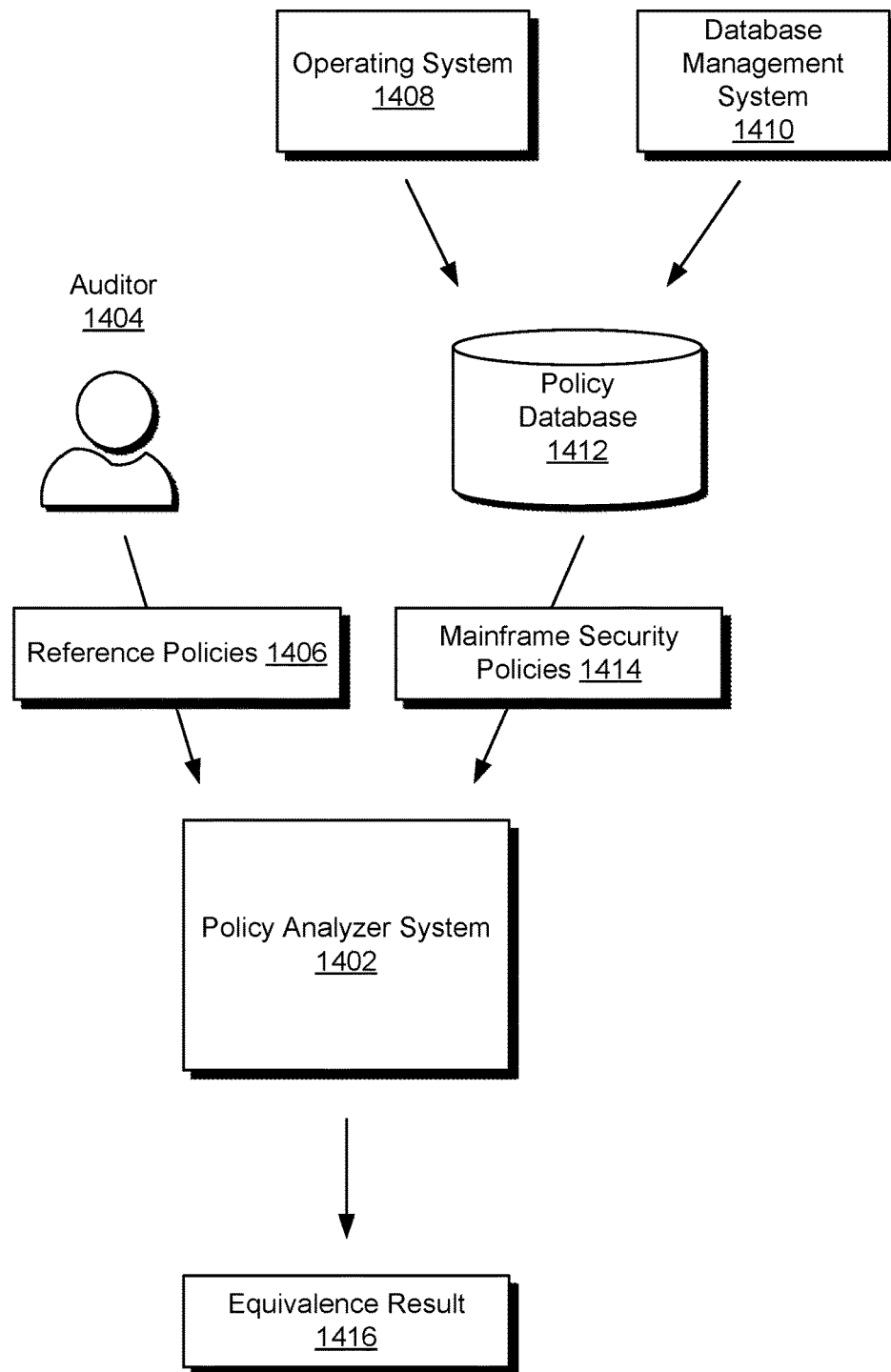
FIG. 14 illustrates a computing environment in which a policy analyzer system is used to validate whether security policies for a mainframe workload implemented on a computing resource service provider are complaint with a reference policy, in accordance with one or more example embodiments of the present disclosure.

FIG. 14 illustrates a computing environment 1400 in which a policy analyzer system is used to validate whether security policies for a mainframe workload implemented on a computing resource service provider are compliant with a reference policy, in accordance with one or more example embodiments of the present disclosure.

In various embodiments, policy analyzer system 1402 refers to a system of a computing resource service provider that supports one or more APIs for evaluating security policies. Policy analyzer system may be implemented as a standalone service, or as an API offered by a service, such as policy management service. Policy analyzer system 1402 is able to determine, with mathematical certainty, whether a first security policy is more permissive than a second security policy and whether two or more security policies are equivalent. In this context, permissiveness is used to describe access to resources. For example, if a first policy can be utilized to access a first computing resource (e.g., resource "A") and a second resource (e.g., resource "B") and a second policy grants access only to computing resource "B." then the first policy may be described as being more permissive than the second policy because there exists a computing resource which the first policy grants access to which the second policy does not grant access to and there does not exist a resource that the second policy grants access to which the first policy does not grant access to. Two policies may be equivalent if they both can be utilized to access to the same resources and deny (either implicitly or explicitly) access to the same resources. Generally speaking, if two policies are not equivalent, they may be said to lack equivalency. In some cases, if a first policy grants access to a first computing resource "A" and a second computing resource "B" and a second policy grants access to the second computing resource "B" and a third computing resource "C" the policies may be said to be incomparable.

An API call supported by the policy analyzer system may accept two security policies and determine whether they are equivalent, whether one policy is more permissive than the other policy, whether the policies are incomparable, and so on. As a second example, an API call may accept two or more security policies and determine whether all of the security policies provided as part of the API request are equivalent. As a third example, an API call may accept a single security policy and compare the security policy against one or more best practices policies. The best practices policies may be a set of security policies that are determined to be a set of permissions that should not be allowed. For example, a first best practices policy may be that a particular data container should not be world-writeable (e.g., any principal, even a guest user or anonymous user can write to the container). The API may verify that best practices policies are being followed by determining that the received policy is not more permissive than each of the best practices policies is. Examples of best practices policies may include resources being world writeable, world readable, world accessible, and the like. In some embodiments, a collection of best practices policies may be determined based on the API call, the type of computing resource requested, and other context information.

A policy analyzer system 1402 may include multiple components and/or modules such as a policy parser, a propositional logic translator, and a satisfiability engine. The policy parser may be a component or module that receives a security policy and obtains one or more permission statements from the policy. For example, if the client provides a first policy "A" and a second policy "B." the policy parser may obtain a first set of permission statements from policy "A" and a second set of permission statements from policy "B." The permission statements may each be associated with the granting or denying access to computing resources. A propositional logic translator may convert permission statements into one or more constraints described using propositional logic. The constraints may be described in various formats and in accordance with various standards such as SMT-LIB standard formats, CVC language, and Center for Discrete Mathematics and Theoretical Computer Science (DIMACS) formats. The propositional logic expressions generated by the propositional logic translator may represent a set of constraints that must be satisfied for the corresponding permission statement to be in effect.

A satisfiability engine may be used to compare the first propositional logic expression and the second propositional logic expression to determine whether one propositional logic is more permissive than the other. A satisfiability engine may be used to analyze the permissiveness of two or more propositional logic expressions. The satisfiability engine may generate additional propositional logic constraints as part of determining whether the first propositional logic expression is more permissive than the second propositional logic expression. The constraints may be generated and evaluated in addition to the constraints of the first propositional logic expression and the second propositional logic expression. The constraints may be generated based at least in part on what a client requests. For example, the satisfiability engine may generate constraints that are satisfied only under circumstances where a first policy grants access to a resource and a second policy denies access to the resource or is neutral regarding the resource in response to a request from a caller to determine whether a first propositional logic expression is more permissive than a second propositional logic expression. The satisfiability engine may be used to verify whether the propositional logic constraints (e.g., those obtained from the first and second propositional logic expressions and those generated by the satisfiability engine. In some embodiments, a command may be used to determine whether the set of constraints are satisfiable. A formula may be satisfiable if there is an interpretation that makes all the asserted formulas true. In other words, the model is satisfiable if each of the constraints is satisfied under some conditions. In some embodiments, the satisfiability engine may be implemented at least in part using an SMT solver such as Z3, as described in https://github.com/Z3Prover/z3. Policy analyzer system 1402 may be implemented using techniques described in U.S. Pat. No. 10,757,128 B2 entitled "SECURITY POLICY ANALYZER SYSTEM AND SATISFIABILITY ENGINE" to Cook et al., which is hereby incorporated by reference in its entirety.

Auditor 1404 may refer to an entity or user that provides reference policies 1406. Reference policies 1406 may refer to best practices policies. In some embodiments, reference policies 1406 encode a regulatory constraint, certification requirement, etc. that the auditor 1404 is attempting to validate. The reference policies may be determined by auditor 1404 or on behalf of auditor 1404 by parsing rules, constraints, requirements, etc. defined by auditor and determining a corresponding set of security policies that reflect them.

In various embodiments, security policies for operating system 1408 and database management system 1410 are stored in a policy database 1412. These resources may be used to perform mainframe workloads, or other suitable applications/workloads. Policy database 1412 is, in various embodiments, the central policy store for all security definitions for a mainframe application. Accordingly, the entire set of security definitions that define how resources of a mainframe environment can be accessed are stored in policy database 1412 and can be retrieved from policy database 1412 as mainframe security policies 1414.

Policy analyzer system 1402 may be used to provide a mathematically rigorous determination of whether mainframe security policies 1414 comply with reference policies 1406. As described above, policy analyzer system determines propositional logic formula for reference policies 1406 and mainframe security policies 1414 and uses a satisfiability engine to determine an equivalence result 1416. Equivalence result 1416 may indicate that the two policies are equivalent. Two policies may be said to be equivalent if the security permissions from the first policy and the second policy apply in the same manner to all actions, resources, and principals—in other words, for any given set of actions, resources, and principals, that the first policy and the second policy will both either deny access (either explicitly based on a denial statement or implicitly based on the lack of a permission granting access) or both will grant access—it will not be the case that one policy grants access and the other denies access. In the case that one policy is determined to be more permissive than another policy, it will be the case that one policy grants access under a set of parameters where another policy denies access.

In some embodiments, policy analyzer system 1402 may provide an indication that mainframe security policies 1414 is more permissive than reference policies 1406 and provides an example tuple of {principal, action, resource} where access to a resource would be granted according to mainframe security policies 1414 but should be denied according to reference policies 1406. This information may be used to remedy non-compliance in the mainframe security, for example, by using a policy management service to update policy database 1412 with updated security policies that prevent access to the resource under the example provided by policy analyzer system 1402.

In some embodiments, policy database 1412 stores frontend security policies that can be evaluated as part of the mainframe application policies to determine the validity of the global security policy within the service provider as a whole. For example, since policies for both the front-end and mainframe are stored in the same policy database 1412, policy analyzer system 1414 can perform an end-to-end analysis and mathematically provide whether an external user accessing the mainframe via front-ends will ever have the capability to perform a specific mainframe request. As another example, policy analyzer system 1414 can be used to identify whether anyone outside of a specific set of mainframe users (e.g., an ops group) read from or write to a specific configuration file.

Figure 15:
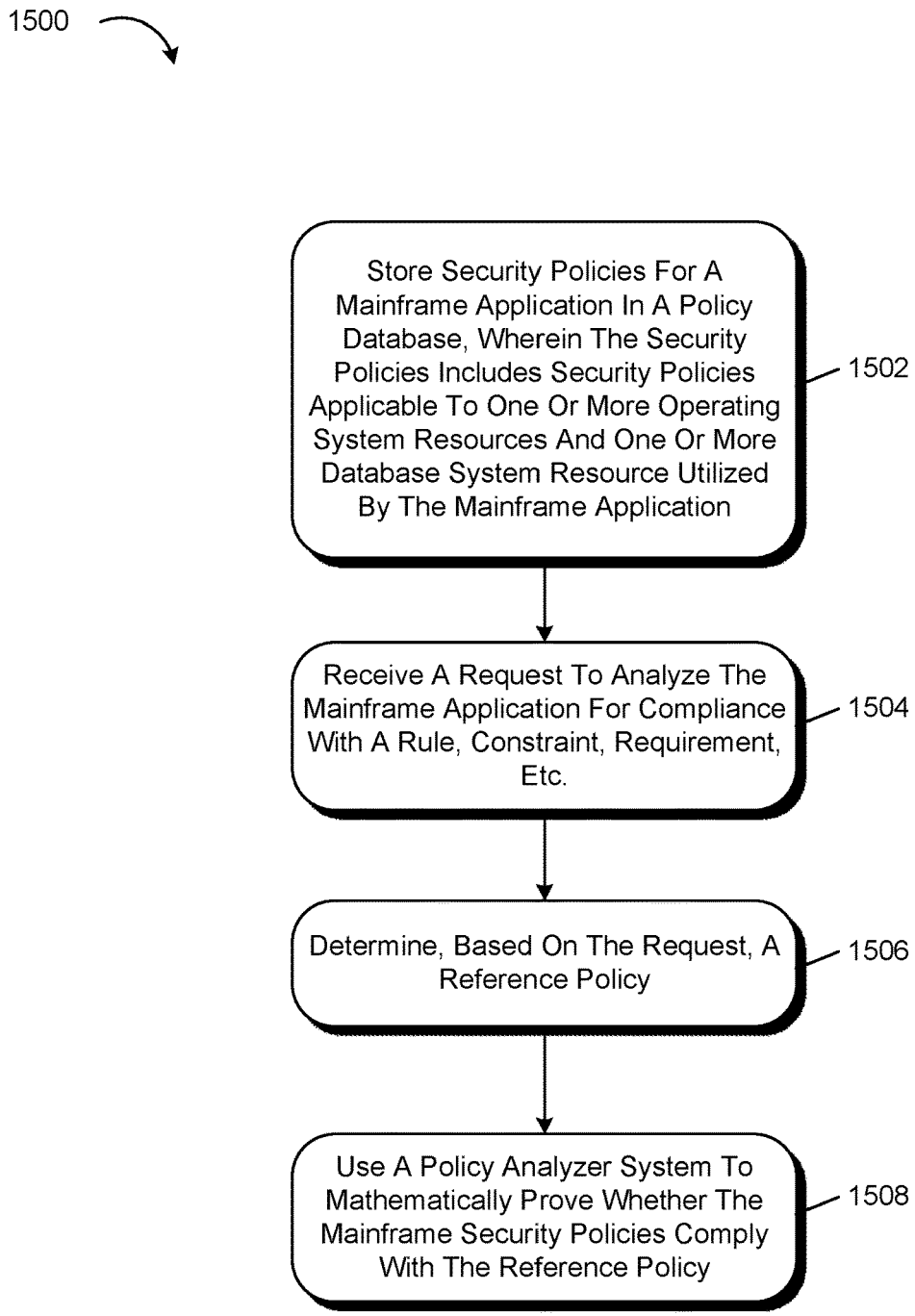
FIG. 15 shows an illustrative example of a process for using a policy analyzer system to verify whether a mainframe application implemented in a computing resource service provider complies with rules, constraints, requirements, etc., in accordance with one or more example embodiments of the present disclosure.

FIG. 15 shows an illustrative example of a process 1500 for using a policy analyzer system to verify whether a mainframe application implemented in a computing resource service provider complies with rules, constraints, requirements, etc., in accordance with one or more example embodiments of the present disclosure. In at least one embodiment, some or all of the process 1500 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 1500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 1500 may be implemented in the context of various systems and methods described elsewhere in this disclosure, such as those discussed in connection with FIGS. 12-14 and 17. In at least one embodiment, process 1500 or a portion thereof is implemented by a computing resource service provider.

In at least one embodiment, process 1500 comprises a step to store 1502 security policies for a mainframe application in a policy database. The security policies may be stored in the policy database as part of a migration of an on-premises or hybrid mainframe environment into a computing resource service provider. As part of the migration, different types of resources in the computing resource service provider may be provisioned to facilitate the migration of the mainframe application.

As described in greater detail in connection with FIGS. 2-5, the computing resource service provider may provision various compute instances—for example, virtual machine instances—with a custom operating system environment to run mainframe applications. In various embodiments, a customized operating system is configured with a kernel-level authorization component that uses a policy management service to manage the permissions for OS-level resources, such as data and executable files. The policy management service may store security policies for the OS resources in a policy database.

Mainframe workloads running on computing resource service providers utilize database systems with externally managed permissions, according to at least one embodiment. In various embodiments, database systems provisioned to run mainframe workloads are configured with a security hook that uses a policy management service to manage the permission for database-level resources, such as the ability to interact with tables and views, execute stored procedures, and so forth.

Various other security definitions for a mainframe workload may also be stored in policy database and collectively, these are referred to as mainframe security policies, according to at least one embodiment. In various embodiments, these additional security definitions can be used to define additional, higher-level functional behavior, such as business-related semantics. For example, a security policy may allow for a specific grant of authorization to revert some operation on a customer account, a grant of authorization to trade or pay for a certain maximal amount, and so forth. These types of semantics are not typically definable in the context of database-level grants and revokes.

Accordingly, a policy database managed by a policy management service may be used to define the entire set of mainframe-related security permissions. This means that, in at least some embodiment, all of the cloud-migrated mainframe application permissions are stored in the central policy database along with any other security definitions related to other services used by the application—for example, if the application also uses data analytics services to gather insight into customer data stored in the database system used for mainframe workloads, those permissions are also stored in the policy database alongside the security policies used by the database services, compute services, etc. that are utilized for the cloud-migrated mainframe application. In some embodiments, the security definitions use regular expressions (regexes) on the resources to minimize and simplify the definition work. For example, "Deny ExUser File/usr/foo/*" may be used to deny ExUser access to any file or directory under/usr/tmp.

In at least one embodiment, process 1500 comprises a step to receive 1504 or otherwise obtain a request to analyze the mainframe application for compliance. Compliance, in this context, may refer to a rule, constraint, requirement, etc. and may be used to determine compliance with requirements set forth by regulators, auditors, compliance specialists, and so forth. In some embodiments, the request may be to perform an audit of the security of the cloud-based mainframe application to determine whether a certificate of compliance for Evaluation Assurance Level or other measurements of assurance should be issued. For example, process 1500 may be used to analyze the cloud-based mainframe application for certification according to EAL4, EAL4+. EAL5, EAL5+, and even higher levels of certification.

In at least one embodiment, process 1500 comprises a step to determine 1506 a reference policy or set of reference policies based on the request. This step may involve translating the requirements for certification standards into a policy-based language format that is amenable to translation into a propositional logic. For example, a reference policy may encode various rules regarding how resources can or cannot be accessed. Compliance requirements may include reference policies to ensure that database contents are not world-readable, for example, as well as other more sophisticated rules to ensure that various data and/or code of the mainframe application can only be used in certain well-defined conditions.

In at least one embodiment, process 1500 comprises a step to use 1508, a policy analyzer system to mathematically prove whether the mainframe security policies comply with the reference policy. In various embodiments, policies are translated into a propositional logic formula, which is then evaluated by a satisfiability engine to determine an equivalence result between reference policies and the mainframe security policies. A Satisfiability Modulo Theories (SMT)-based solver may be used to prove that certain security assurances are met by the computing resource service provider hosting the mainframe application. For example, the policy analyzer system may provably demonstrate that the only way to access certain privileged information within the computing resource service provider is via a specific web service API endpoint and only while a specific administrative role has been assumed.

Policy analyzer system may provide an equivalence result that indicates that the mainframe security policies are equivalent to or less permissive than the reference policies. This indication may be sufficient to demonstrate that the mainframe security policy implemented by the computing resource service provider is in compliance with the aforementioned rule, constraint, requirement, etc. However, in some cases, policy analyzer system may provide an equivalence result indicating that the mainframe security policies are either entirely more permissive than the reference policies, or that the mainframe security policies are in some respects more permissive than the reference policies while also being less permissive in other respects. In some embodiments, policy analyzer system provides an example scenario in which the mainframe security policies and the reference policies differ—for example, a tuple comprising a principal, resource, and action that, if evaluated using the reference policies, indicates access should be denied, but if evaluated under the mainframe security policies, indicate that access should be granted. These example scenarios may be used to update the mainframe security policies to ensure that they are in compliance with the reference policies, for example, by adding additional security policies or modifying existing security policies to ensure that the example scenario evaluates to a denial of access with an updated set of applicable security policies.

As described throughout this disclosure, a permission may be associated with a security policy. In some embodiments, a permission may specify a principal, a resource, an action, a condition, an effect, or various combinations thereof. In some embodiments, a permission may also specify a plurality of one or more of these elements such as, for example, a set or class of users, a collection of resources, several different actions, and/or multiple conditions. In some embodiments, the permission may specify one or more wildcard or otherwise modifiable characters that may be used to denote that the permission may be modified to make the permission applicable to different users and their associated resources. Wildcards may be represented in various formats—for example, an asterisk may represent any number of characters and a question mark may represent any single character. In some embodiments, the policy may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure.

The principal may be a user, a group, an organization, a role, a collection and/or a combination of these or other such entities. A principal may be any entity that is capable of submitting API calls that cause an action associated with a resource to be performed and/or any entity to which permissions associated with a resource may be granted. As an example, a permission may have a principal element specified in the following manner:

"Principal": "rn:ws:iam::ducksfan8"

In some embodiments, the principal is identified by a resource name that uniquely identifies the principal. A principal may include one or more name spaces that include additional information regarding the principal. For example, "rn" may refer to a resource name prefix and identifiy the subsequent information as part of a resource name; "ws" may refer to a partition namespace that the resource is in; "iam" may refer to a service namespace that identifies a service of a computing resource service provider (e.g., the computing resource service provider may provide services related to identity and access management); namespaces may additionally be omitted (note that there are two semicolons in the example above between "iam" and "ducksfan8")—in some formats and/or for some resources, a region namespace may be an option; and "ducksfan8" may refer to an identifier for the account, such as the account that owns the resource specified in the permission.

The resource may refer to a computing resource of a computing resource service provider. Computing resources of a computing resource service provider may include: computing resources (e.g., virtual machine instances); storage resources (e.g., scalable storage, block storage, and managed file storage systems); database systems (e.g., managed relational database systems); migration services (e.g., applications, services, and hardware for streamlining the transfer of data from one physical data center to another); network and content delivery; developer tools; management tools; security, identity, and access management services; analytics services; artificial intelligence services; and more. Computing resources may be organized in a hierarchy and may use structures such as folders, directories, buckets, etc. to organize sets of computing resources into groupings. In some cases, policies and/or permissions may be applied directly to a bucket and grant cross-account access to an environment. As an example, a permission may have a resource element specified in the following manner:

"Resource": "rn:ws:storage:::bucket/MM4_Heisman.png"

In some embodiments, the resource is identified by a resource name that uniquely identifies the resource. In some cases, the resource may share the same naming convention as the principal or other elements of the permission. However, this need not be the case, as each separate element of a permission may use a naming convention, namespace, format, etc. that is independent of other elements. In the example resource given above, "rn" may refer to a resource name prefix and identifies the subsequent information as part of a resource name; "ws" may refer to a partition namespace that the resource is in; "storage" may refer to a service namespace that identifies a service of a computing resource service provider (e.g., the computing resource service provider may provide services related to object-based storage); as discussed elsewhere, namespaces may be omitted in some cases—for example, a region namespace and/or account namespace may be omitted; and a resource which may also include an indicator of the type of resource. In the example above, the resource may indicate an image in the Portable Network Graphics (PNG) format and is stored in a bucket.

In various embodiments, resources may refer to resources managed by a computing resource service provider, but may also refer to other resources, such as resources that are managed by database systems or compute instances hosted by the computing resource service provider.

The action may be the specific action or actions that will be allowed or denied by the permission. Different types of services (e.g., having different service namespaces) may support different actions. For example, an identity and account management service may support an action for changing passwords, and a storage service may support an action for deleting objects. An action may be performed in association with the resource and may, for example, be identified by a type of API call, a library call, a program, a process, a series of steps, a workflow, or some other such action. As an example, a permission may have an action element specified in the following manner:

"Action": "storage:GetObject"

In this example, the action that is allowed or denied (determined based on the effect specified in the permission) corresponds to a storage service that supports an action (e.g., API call) for GetObject, which may be used in connection with obtaining an object and/or access to an object of a storage service. As discussed elsewhere, various namespaces may be used in connection with specifying an action. Wildcards may be used to specify multiple actions. For example, an action element described as "Action": "storage:*" may refer to all APIs supported by a storage service. As a second example, an action element described as "Action": "iam:*AccessKey*" may refer to actions supported by an identity and access management service in connection with access keys of a service-illustrative examples may include actions related to creating an access key (e.g., a "CreateAccessKey" action may exist), deleting an access key (e.g., "DeleteAccessKey"), listing access keys (e.g., "ListAccessKeys"), and updating an existing access key (e.g., "UpdateAccessKey").

In various embodiments, different types of actions are supported by different types of resources. For example, OS-managed resources, database-managed resources, and mainframe-managed resources may each have different actions that are capable of being performed. The set of possible actions for different resource types may be ascertained from security definitions that are exported from a mainframe security database, such as an RACF database. In some embodiments, the set of actions identified by a RACF database may correspond to the set of supported actions.

The condition element may be one or more conditions that specify when a policy is in effect. In some embodiments, the condition element is optional and may be omitted in some permissions. Conditions may be described as Boolean expressions that may be used to determine whether the policy is in effect (i.e., if the expression evaluates to TRUE) or not in effect (i.e., if the expression evaluates to FALSE). Policies that are not in effect may be unenforced or ignored by an authorization module (such as those described elsewhere in this). In some embodiments, conditions in a permission may be evaluated against values provided as part of a web API request corresponding to one or more APIs specified in the action element. As an example, a permission may have a condition element specified in the following manner:

"Condition": {"DateLessThan": {"ws:CurrentTime": "2014-12-13"} }

In this example, the condition, the "ws:CurrentTime" value of the request is compared against a literal value "2104-12-13" using the condition operator "DateLessThan" which may be used to evaluate whether the condition is met. In this example, the condition may be true when the current time (e.g., the time the request is received by the service provider) is less than the supplied date of Dec. 13, 2014. It should be noted that the key value (in the example, the current time) may be compared not only against literal values, but policy variables as well. Various other types of condition operators may exist, which may be used for comparing string conditions, numeric conditions, Boolean conditions, binary conditions (e.g., testing values in binary format), IP address conditions (e.g., testing values against a specific IP address or range of IP addresses), and more. Conditions may, furthermore, include quantifiers. For example, a string condition may include an operator such as "StringEquals" that compares whether two strings are equal, and a similar operator may include a quantifier such that "StringEqualsIfExists" may be used to compare two strings when the key value exists in the context of an evaluation. Quantifiers may be used in conjunction with wildcards where multiple resources matching a wildcard expression may support different context keys. In some embodiments, such as those where conditions include quantifier, first-order logic may be utilized rather than propositional logic.

An effect may refer to whether the permission is used to grant or deny access to the computing resources specified in the permission in the resource element. An effect may be an ALLOW effect, which grants access to a resource, and a DENY effect, which denies access to a resource. In some embodiments, access to computing resources of a computing resource service provider are denied by default and a permission affirmatively including an ALLOW effect is required. As an example, a permission may have an effect element specified in the following manner:

"Effect": "ALLOW"

Accordingly, a permission statement that grants a particular principal (e.g., "rn:ws:iam::ducksfan8") access to call a storage service API (e.g., "storage:GetObject") and obtain a particular image (e.g., "rn:ws:storage:::bucket/MM4_Heisman.png") when a specific condition is true (e.g., the API request is made prior to Dec. 13, 2016) may be specified in the following manner:

"Statement": [
{
"Effect": "ALLOW",
"Principal": "rn:ws:iam::ducksfan8",
"Action": "storage:GetObject",

```
    "Resource":    "rn:ws:storage:::bucket/
       MM4_Heisman.png",
    "Condition": {
       "DateLessThan": {"ws:CurrentTime": "2014-12-
          13"}
    }
  }
]
```

It should be noted that the examples described above merely described one of many ways in which permissions may be expressed. Of course, in other embodiments, variations on the principles described above may be applied in various ways.

Figure 16:
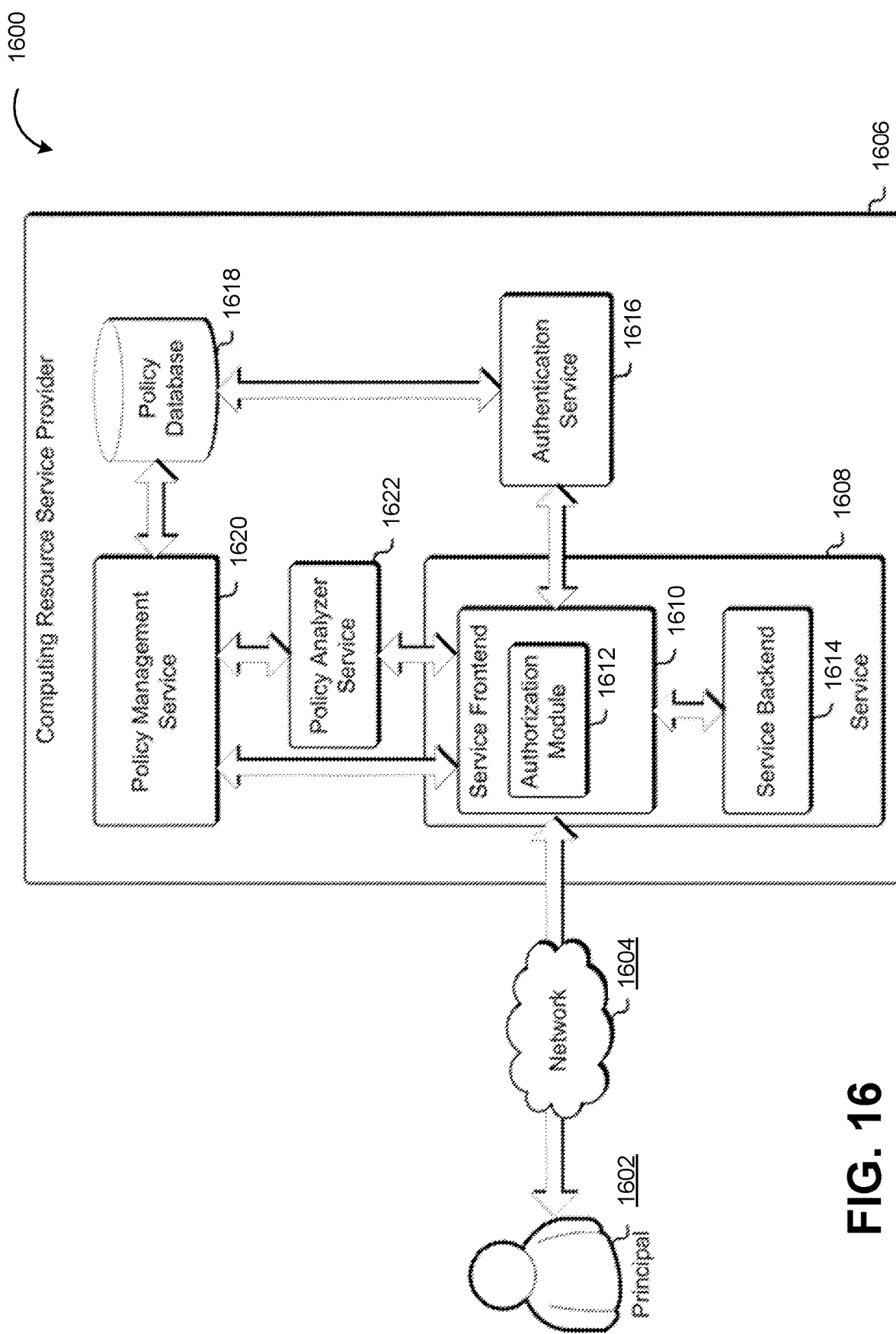
FIG. 16 is an illustrative example of an environment in which a distributed computer system may utilize the various techniques described herein.

FIG. 16 is an illustrative example of an environment 1600 in which a distributed computer system may utilize the various techniques described herein. In an embodiment, a principal 1602 may use a computing device to communicate over a network 1604 with a computing resource service provider 1606. Communications between the computing resource service provider 1606 and the principal 1602 may, for instance, be for the purpose of accessing a service 1608 operated by the computing resource service provider 1606, which may be one of many services operated by the computing resource service provider 1606. The service 1608 may comprise a service frontend 1610 and a service backend 1614. The principal 1602 may, through an associated computing device, issue a request for access to a service 1608 (and/or a request for access to resources associated with the service 1608) provided by a computing resource service provider 1606. The request may be, for instance, a web service application programming interface request. The principal may be a user, or a group of users, or a role associated with a group of users, or a process representing one or more of these entities that may be running on one or more remote (relative to the computing resource service provider 1606) computer systems, or may be some other such computer system entity, user, or process. Each user, group, role, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider, where the computing resource service provider manages permissions for the identity and where the entity may include one or more sub-entities, which themselves may have identities.

The principal 1602 may communicate with the computing resource service provider 1606 via one or more connections (e.g., transmission control protocol (TCP) connections). The principal 1602 may use a computer system client device to connect to the computing resource service provider 1606. The client device may include any device that is capable of connecting with a computer system via a network, such as example devices discussed below. The network 1604 may include, for example, the Internet or another network or combination of networks discussed below.

The computing resource service provider 1606, through the service 1608, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments.

The request for access to the service 1608 may be received by a service frontend 1610, which, in some examples, comprises a web server configured to receive such requests and to process them according to one or more policies associated with the service 1608. The request for access to the service 1608 may be a digitally signed request and, as a result, may be provided with a digital signature. In some embodiments, the web server employs techniques described herein synchronously when processing the requests. The service frontend 1610 may then send the request and the digital signature for verification to an authentication service 1616. The authentication service 1616 may be a stand-alone service or may be part of a service provider or other entity. The authentication service 1616, in an embodiment, is a computer system configured to perform operations involved in authentication of principals.

Upon successful authentication of a request, the authentication service 1616 may then obtain policies applicable to the request. A policy may be applicable to the request by way of being associated with the principal 1602, a resource to be accessed as part of fulfillment of the request, a group in which the principal 1602 is a member, a role the principal 1602 has assumed, and/or otherwise. To obtain policies applicable to the request, the authentication service 1616 may transmit a query to a policy database 1618 managed by a policy management service 1620. The query to the policy database 1618 may be a request comprising information sufficient to determine a set of policies applicable to the request. The query to the policy database may, for instance, contain a copy of the request and/or contain parameters based at least in part on information in the request, such as information identifying the principal, the resource, and/or an action (operation to be performed as part of fulfillment of the request).

A policy management service 1620 may provide access to, and administration of, policies applicable to requests for access to computing resources (e.g., web service application programming interface requests). For example, the policy management service may receive information sufficient for selecting policies applicable to pending requests. In some embodiments, the information may be copies of the requests, or may be information generated based at least in part on the requests. For example, a service such as a service frontend 1610 may receive a request for access to resources and may generate a query to the policy management service based at least in part on information specified by the request.

Having obtained any policies applicable to the request, the authentication service 1616 may provide an authentication response and, if applicable, the obtained policies back to the service frontend 1610. The authentication response may indicate whether the response was successfully authenticated. The service frontend 1610 may then check whether the fulfillment of the request for access to the service 1608 would comply with the obtained policies using authorization module 1612. Note that, in some embodiments, a policy may be configured such that whether fulfillment of a request violates the policy depends on whether a violation of a uniqueness constraint has occurred. For instance, some data may be considered to be less sensitive than other data and requests for the less sensitive data may be fulfilled despite a detected violation of a uniqueness constraint while access to the more sensitive data may require that a uniqueness constraint violation not have occurred in connection with a public key specified to be used in authentication of requests. Similar techniques may be employed for other types of computing resources, such as computing devices, storage locations, collections of data, identities, policies, and the like.

An authorization module 1612 may be a process executing on the service frontend that is operable to compare the request to the one or more permissions in the policy to determine whether service may satisfy the request (i.e., whether fulfillment of the request is authorized). For example, the authorization module may compare an API call associated with the request against permitted API calls specified by the policy to determine if the request is allowed. If the authorization module 1612 is not able to match the request to a permission specified by the policy, the authorization module 1612 may execute one or more default actions such as, for example, providing a message to the service frontend that causes the service frontend to deny the request, and causing the denied request to be logged in the policy management service 1620. If the authorization matches the request to one or more permissions specified by the policy, the authorization module 1612 may resolve this by selecting the least restrictive response (as defined by the policy) and by informing the service frontend whether the fulfillment of the request is authorized (i.e., complies with applicable policy) based on that selected response. The authorization module 1612 may also select the most restrictive response or may select some other such response and inform the service frontend whether the fulfillment of the request is authorized based on that selected response. Note that, while FIG. 16 shows the authorization module 1612 as a component of the service frontend 1610, in some embodiments, the authorization module 1612 is a separate service provided by the computing resource service provider 1606 and the frontend service may communicate with the authorization module 1612 over a network.

Finally, if the fulfillment of the request for access to the service 1608 complies with the applicable obtained policies, the service frontend 1610 may fulfill the request using the service backend 1614. A service backend 1614 may be a component of the service configured to receive authorized requests from the service frontend 1610 and configured to fulfill such requests. The service frontend 1610 may, for instance, submit a request to the service backend to cause the service backend 1614 to perform one or more operations involved in fulfilling the request. In some examples, the service backend 1614 provides data back to the service frontend 1610 that the service frontend provides in response to the request from the principal 1602. In some embodiments, a response to the principal 1602 may be provided from the service frontend 1610 indicating whether the request was allowed or denied and, if allowed, one or more results of the request.

One or more operations of the methods, process flows, or use cases of FIGS. 1-17 may have been described above as being performed by a user device, or more specifically, by one or more program module(s), applications, or the like executing on a device. It should be appreciated, however, that any of the operations of the methods, process flows, or use cases of FIGS. 1-17 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-17 may be described in the context of the illustrative devices, it should be appreciated that such operations may be implemented in connection with numerous other device configurations.

The operations described and depicted in the illustrative methods, process flows, and use cases of FIGS. 1-17 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-17 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 17:
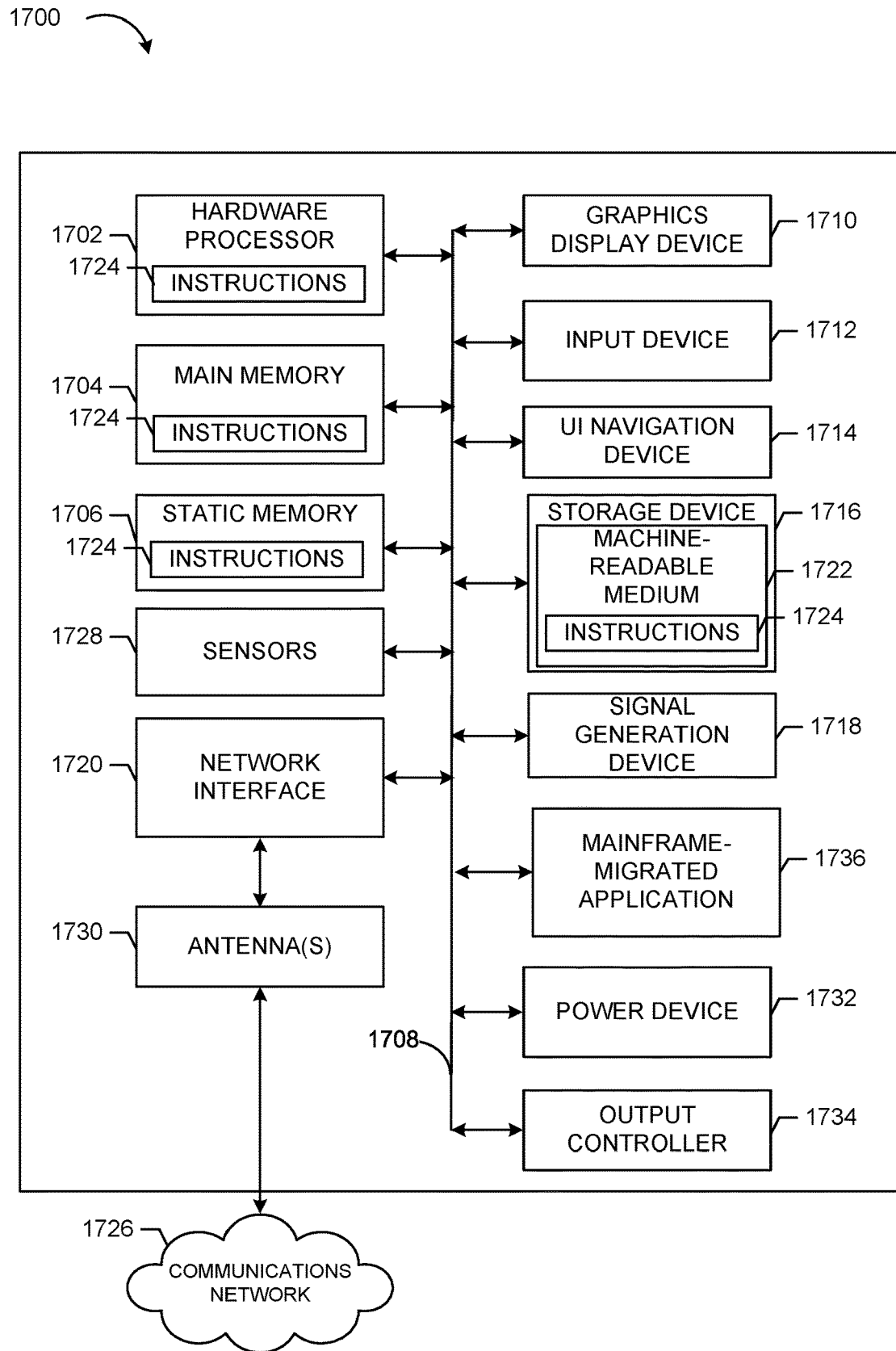
FIG. 17 illustrates a block diagram of an example machine upon which any of one or more techniques (e.g., methods) may be performed, in accordance with one or more example embodiments of the present disclosure.

FIG. 17 illustrates a block diagram of an example of a machine 1700 (e.g., implemented in whole or in part in the context of embodiments described in connection with other figures. In some embodiments, the machine 1700 may operate as a standalone device or may be connected (e.g., networked) to other machines. In a networked deployment, the machine 1700 may operate in the capacity of a server machine, a client machine, or both in server-client network environments. In an example, the machine 1700 may act as a peer machine in Wi-Fi direct, peer-to-peer (P2P) (or other distributed) network environments. The machine 1700 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saas), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1700 may include any combination of the illustrated components. For example, the machine 1700 may include a hardware processor 1702 (e.g., a central processing unit (CPU), a graphics processing unit (GPU), a hardware processor core, or any combination thereof), a main memory 1704 and a static memory 1706, some or all of which may communicate with each other via an interlink (e.g., bus) 1708. The machine 1700 may further include a power management device 1732, a graphics display device 1710, an alphanumeric input device 1712 (e.g., a keyboard), and a user interface (UI) navigation device 1714 (e.g., a mouse). In an example, the graphics display device 1710, alphanumeric input device 1712, and UI navigation device 1714 may be a touch screen display. The machine 1700 may additionally include a storage device (e.g., drive unit) 1716, a signal generation device 1718, and a network interface device/transceiver 1720 coupled to antenna(s) 1730. The machine 1700 may include an output controller 1734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 1716 may include a machine readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within the static memory 1706, or within the hardware processor 1702 during execution thereof by the machine 1700. In an example, one or any combination of the hardware processor 1702, the main memory 1704, the static memory 1706, or the storage device 1716 may constitute machine-readable media.

While the machine-readable medium 1722 is illustrated as a single medium, the term "machine-readable medium" may include a single medium or multiple media (e.g., a centralized or distributed database, and/or associated caches and servers) configured to store the one or more instructions 1724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1700 and that cause the machine 1700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

Mainframe-migrated application 1736 may refer to various a software and/or hardware that is migrated from an on-premises environment into a cloud-based provider. The cloud-based provider may use various types of computing resources, such as compute services and database services, to implement the mainframe functionality in a cloud provider. In various embodiments, security policies for a mainframe-migrated application are centrally managed in a policy database.

The instructions 1724 may further be transmitted or received over a communications network 1726 using a transmission medium via the network interface device/transceiver 1720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1720 may include one or more physical jacks (e.g., Ethernet, coaxial, or phone jacks) or one or more antennas to connect to the communications network 1726. In an example, the network interface device/transceiver 1720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refer to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second." "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could." "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method, comprising:
provisioning a kernel of an operating system with an authorization interceptor that determines whether to grant or deny access to resources managed by the operating system;
loading the operating system on a compute instance;
obtaining, from an application running on the operating system, a system call that indicates a request to access a resource managed by the operating system;
determining, at the authorization interceptor, a request context for the system call, wherein the request context comprises:
a principal identifier corresponding to a user associated with the system call;
a resource identifier associated with the resource managed by the operating system; and an action corresponding to a permission requested in the system call, wherein to determine the request context for the system call includes,
  determine a user identifier associated with the user call, and
  decorate the user identifier of the user with an operating system identifier to determine the principal identifier;
determining, based on the resource, one or more applicable security policies managed by a policy management service;
performing a policy evaluation using the request context and the one or more applicable security policies to determine an indication of whether to grant access to the resource managed by the operating system; and
based on the indicating being to grant access to the resource, causing the kernel to access the resource to fulfill the system call.

2. The computer-implemented method of claim 1, further comprising:
  obtaining, at the kernel, a second system call to grant the user a second permission on the resource managed by the operating system;
  providing, to the policy management service, a second request to update a security policy associated with the user, wherein the second request comprises the principal identifier, the resource identifier, and a second action corresponding to the second permission; and
  obtaining, from the policy management service, a second indication that the second permission was granted to the user.

3. The computer-implemented method of claim 1, further comprising:
  using the policy management service to grant a first user a first set of permissions to the resource; and
  using the policy management service to grant a second user a second set of permissions to the resource, wherein the second set of permissions is different from the first set of permissions.

4. The computer-implemented method of claim 1, wherein the application comprises a mainframe workload.

5. A system, comprising:
  one or more processors; and
  memory storing executable instructions that, as a result of execution by the one or more processors, cause the system to:
    obtain, within a kernel of an operating system, a system call from an application running on the operating system that indicates a request to access a resource managed by the operating system;
    determine, within the kernel, a request context for the system call, wherein the request context comprises:
      a principal identifier associated with a user of the system call;
      a resource identifier associated with the resource managed by the operating system; and
      an action corresponding to a permission requested in the system call, wherein to determine the request context for the system call includes,
      determine a user identifier associated with the user call, and
      decorate the user identifier of the user with an operating system identifier to determine the principal identifier;
    determine, based on the resource, one or more applicable security policies managed by a policy management service;
    perform a policy evaluation using the request context and the one or more applicable security policies to determine an indication of whether to grant access to the resource managed by the operating system; and
    based on the indication being to grant access to the resource, cause the kernel to access the resource to fulfill the system call.

6. The system of claim 5, wherein the executable instructions include further instructions that, as a result of execution by the one or more processors, further cause the system to:
  obtain, at the kernel, a second system call to grant a second permission on the resource managed by the operating system;
  determine, based on the second system call, a second request context, wherein the second request context comprises the principal identifier, the resource identifier, and a second action corresponding to the second permission;
  provide, to the policy management service, a second request to update a security policy associated with the user, wherein the second request comprises the second request context; and
  obtain, from the policy management service, a second indication that the second permission was granted to the user.

7. The system of claim 6, wherein the second request context further comprises a condition on the grant.

8. The system of claim 5, wherein the operating system is running on a compute instance of the system.

9. The system of claim 8, wherein the compute instance is a virtual machine instance.

10. The system of claim 5, wherein the executable instructions to determine, within the kernel, the request context for the system call includes instructions that, as a result of execution by the one or more processors, cause the system to:
  determine the user has assumed a role; and
  determine the principal identifier based on a role identifier of the role assumed by the user.

11. The system of claim 5, wherein the application comprises a mainframe workload.

12. A non-transitory computer-readable storage medium storing executable instructions that, as a result of being executed by one or more processors of a computer system, cause the computer system to at least:
  obtain, within a kernel of an operating system, a system call from an application running on the operating system that indicates a request to access a resource managed by the operating system;
  determine, within the kernel, a request context for the system call, wherein the request context comprises:
    a principal identifier associated with a user of the system call;
    a resource identifier associated with the resource managed by the operating system; and
    an action corresponding to a permission requested in the system call, wherein the instructions to determine the request context include instructions to decorate the user with an operating system identifier to determine the principal identifier;
  determine, based on the resource, one or more applicable security policies managed by a policy management service;
  perform a policy evaluation using the request context and the one or more applicable security policies to determine an indication of whether to grant access to the resource managed by the operating system; and based on the indication being to grant access to the resource, cause the kernel to access the resource to fulfill the system call.

13. The non-transitory computer-readable storage medium of claim 12, wherein the executable instructions include further instructions that, as a result of execution by the one or more processors, further cause the system to:

obtain, at the kernel, a second system call to grant a second permission on the resource managed by the operating system;

determine, based on the second system call, a second request context, wherein the second request context comprises the principal identifier, the resource identifier, and a second action corresponding to the second permission;

provide, to the policy management service, a second request to update a security policy associated with the user, wherein the second request comprises the second request context; and obtain, from the policy management service, a second indication that the second permission was granted to the user.

14. The non-transitory computer-readable storage medium of claim 12, wherein the second request context further comprises a condition on the grant.

15. The non-transitory computer-readable storage medium of claim 12, wherein the executable instructions to determine, within the kernel, the request context for the system call includes instructions that, as a result of execution by the one or more processors, cause the system to:

determine the user has assumed a role; and determine the principal identifier based on a role identifier of the role assumed by the user.

16. The non-transitory computer-readable storage medium of claim 12, wherein the operating system is running on a compute instance of the system.

17. The non-transitory computer-readable storage medium of claim 16, wherein the compute instance is a container instance.

18. The non-transitory computer-readable storage medium of claim 12, wherein the operating system is a Linux or Unix-based operating system.

* * * * *